(12) United States Patent
Iwamoto

(10) Patent No.: US 11,131,829 B2
(45) Date of Patent: Sep. 28, 2021

(54) ZOOM LENS AND IMAGE PICKUP APPARATUS

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 69 days.

(21) Appl. No.: 16/019,593

(22) Filed: Jun. 27, 2018

(65) Prior Publication Data

US 2019/0004277 A1 Jan. 3, 2019

(30) Foreign Application Priority Data

Jun. 28, 2017 (JP) .............................. JP2017-126009

(51) Int. Cl.
*G02B 15/14* (2006.01)
*G02B 7/04* (2006.01)
(Continued)

(52) U.S. Cl.
CPC ................ *G02B 7/04* (2013.01); *G02B 9/64* (2013.01); *G02B 13/06* (2013.01); *G02B 13/22* (2013.01);
(Continued)

(58) Field of Classification Search
CPC ... G02B 7/04; G02B 9/34; G02B 9/60; G02B 9/62; G02B 9/64; G02B 13/0045;
(Continued)

(56) References Cited

U.S. PATENT DOCUMENTS

| 5,576,891 A | 11/1996 | Ohashi |
| 6,118,592 A | 9/2000 | Kohno et al. |

(Continued)

FOREIGN PATENT DOCUMENTS

| CN | 1755412 A | 4/2000 |
| CN | 1517742 A | 8/2004 |

(Continued)

OTHER PUBLICATIONS

Chinese Office Action dated Oct. 9, 2020, for Corresponding Chinese Application No. 201810657093.3.
(Continued)

*Primary Examiner* — Marin Pichler
(74) *Attorney, Agent, or Firm* — Carter, DeLuca & Farrell LLP

(57) ABSTRACT

The zoom lens according to the present invention includes a plurality of lens units consisting of front and rear groups having negative and positive refractive powers at a wide angle end (WAE), respectively. An interval between front and rear groups on an optical axis is longest among all intervals between adjacent ones of plurality of lens units at WAE. The rear group is disposed at an image side of front group and includes a plurality of lens units including a negative lens unit LN (LULN) disposed closest to image side. The LULN includes negative and positive lenses disposed closest to object and image sides in LULN, respectively. A focal length of LULN, a focal length of zoom lens at WAE, a distance on optical axis between a lens surface closest to object side and that closest to image side in LULN, and a back focus at WAE are appropriately set.

13 Claims, 16 Drawing Sheets

(51) Int. Cl.
  *G02B 13/06* (2006.01)
  *G02B 9/64* (2006.01)
  *G02B 15/177* (2006.01)
  *G02B 13/22* (2006.01)
(52) U.S. Cl.
  CPC . *G02B 15/1435* (2019.08); *G02B 15/143503* (2019.08); *G02B 15/177* (2013.01)
(58) Field of Classification Search
  CPC ...... G02B 13/22; G02B 15/14; G02B 15/142; G02B 15/1425; G02B 15/143503; G02B 15/144; G02B 15/1445; G02B 15/144507; G02B 15/144511; G02B 15/145; G02B 15/1455; G02B 15/145507; G02B 15/145513; G02B 15/146; G02B 15/1465; G02B 15/177
  USPC .................................................. 359/676, 686
  See application file for complete search history.

(56) References Cited

U.S. PATENT DOCUMENTS

| | | | |
|---|---|---|---|
| 7,813,051 | B2 | 10/2010 | Saori |
| 9,217,851 | B2 | 12/2015 | Iwamoto |
| 2005/0122596 | A1 | 6/2005 | Ohashi |
| 2011/0090574 | A1 | 4/2011 | Harada et al. |
| 2014/0055659 | A1 | 2/2014 | Iwamoto |
| 2014/0085513 | A1* | 3/2014 | Tashiro ................ G02B 15/177 348/240.3 |
| 2014/0125858 | A1 | 5/2014 | Sugita |
| 2014/0307152 | A1 | 10/2014 | Iwamoto |
| 2015/0077594 | A1 | 3/2015 | Nakahara |
| 2016/0077318 | A1 | 3/2016 | Kawamura et al. |
| 2016/0209632 | A1* | 7/2016 | Imaoka ................ G02B 15/177 |
| 2017/0010437 | A1 | 1/2017 | Asami |
| 2017/0108679 | A1 | 4/2017 | Eguchi |
| 2017/0176729 | A1 | 6/2017 | Kubota |
| 2017/0199356 | A1 | 7/2017 | Iwamoto |
| 2017/0276917 | A1 | 9/2017 | Iwamoto |
| 2018/0284406 | A1 | 10/2018 | Iwamoto |
| 2018/0356618 | A1* | 12/2018 | Machida ............. G02B 15/173 |

FOREIGN PATENT DOCUMENTS

| | | |
|---|---|---|
| CN | 100381855 C | 4/2008 |
| CN | 101487925 A | 7/2009 |
| CN | 101770067 A | 7/2010 |
| CN | 103529541 A | 1/2014 |
| CN | 106249391 A | 12/2016 |
| EP | 2955558 A1 | 12/2015 |
| JP | H11109233 A | 4/1999 |
| JP | 2006337648 A | 12/2006 |
| JP | 2007148056 A | 6/2007 |
| JP | 2010039426 A | 2/2010 |
| JP | 2011059293 A | 3/2011 |
| JP | 2012150248 A | 8/2012 |
| JP | 2012212087 A | 11/2012 |
| JP | 2015028530 A | 2/2015 |
| JP | 2015138122 A | 7/2015 |
| JP | 2016031419 A | 3/2016 |
| JP | 2016048354 A | 4/2016 |
| JP | 2016075742 A | 5/2016 |
| WO | 2017094662 A1 | 6/2017 |
| WO | 2017094663 A1 | 6/2017 |
| WO | 2018139160 A1 | 8/2018 |

OTHER PUBLICATIONS

Notice of Reasons for Refusal issued by the Japan Patent Office dated Mar. 9, 2021 in corresponding JP Patent Application No. 2017-126009, with English translation.

Notification of the Second Office Action issued by the China National Intellectual Property Administration dated May 28, 2021 in corresponding CN Patent Application No. 201810657093.3, with English translation.

* cited by examiner

ZOOM LENS AND IMAGE PICKUP APPARATUS

BACKGROUND OF THE INVENTION

Field of the Invention

The present invention relates to a zoom lens and an image pickup apparatus and is advantageously applicable to an image pickup optical system for use in an image pickup apparatus such as a digital camera, a video camera, a TV camera, or a surveillance camera.

Description of the Related Art

It is demanded that an image pickup optical system for use in an image pickup apparatus (camera) be a small zoom lens having a short total length of the zoom lens and having high optical performance over the entire zoom range. It is also demanded that a zoom lens have good telecentricity at the image side because off-axial rays incident on an image pickup element at large angles cause shading (color shading) and a deficiency in the light amount of peripheral rays.

Various zoom lenses have heretofore been proposed to satisfy these demands (Japanese Patent Application Laid-Open No. 2011-059293). Japanese Patent Application Laid-Open No. 2011-059293 discloses a zoom lens aiming to shorten the total length of the zoom lens and offer good telecentricity by using a lens unit having a negative refractive power that is disposed closest to the image side and includes a positive lens closest to the image side.

In recent years, what is required for a zoom lens for use in an image pickup apparatus is to, for example, have high optical performance over the entire zoom range, have good telecentricity at the image side, and also, have a small size with a short total length of the zoom lens. When, for example, good telecentricity at the image side is not obtained, principal rays are incident on a peripheral portion of an image pickup element at such a large angle that problems occur such as shading and a deficiency in the light amount of peripheral rays to degrade the image quality of a taken image. To solve these problems, it is important to appropriately set the number of lens units forming the zoom lens, the lens configurations of each lens unit, the refractive powers of each lens unit, the position of an aperture stop, and the like.

SUMMARY OF THE INVENTION

The zoom lens according to an aspect of the present invention comprising a plurality of lens units, intervals between adjacent ones of the lens units being changed during zooming, in which the plurality of lens units consist of a front group including at least one lens unit and a rear group disposed at an image side of the front group and including a plurality of lens units, an interval between the front group and the rear group on an optical axis is the longest among all the intervals between the adjacent ones of the lens units at a wide angle end, the front group has a negative refractive power at the wide angle end, the rear group has a positive refractive power at the wide angle end, the rear group comprises a lens unit LN having a negative refractive power and disposed closest to the image side, the lens unit LN comprises a negative lens LNN disposed closest to an object side among lenses included in the lens unit LN and a positive lens LNP disposed closest to the image side among the lenses included in the lens unit LN, and the following conditional expressions are satisfied:

$$-2.5 < fn/fw < -0.6, \text{ and}$$

$$0.9 < D/Skw < 3.0$$

where fn represents a focal length of the lens unit LN, fw represents a focal length of the zoom lens at the wide angle end, D represents a distance on the optical axis from a lens surface closest to the object side in the lens unit LN to a lens surface closest to the image side in the lens unit LN, and skw represents a back focus at the wide angle end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. A zoom lens of each Example includes a plurality of lens units in which intervals between adjacent ones of the lens units are changed during zooming. The plurality of lens units consist of a front group including at least one lens unit and a rear group which is disposed at the image side of the front group and includes a plurality of lens units. Over the entire zoom range, the interval between the front group and the rear group on the optical axis is the longest among all the distances between adjacent ones of the lens units. The front group has a negative refractive power at the wide angle end, and the rear group has a positive refractive power at the wide angle end.

Figure 1:
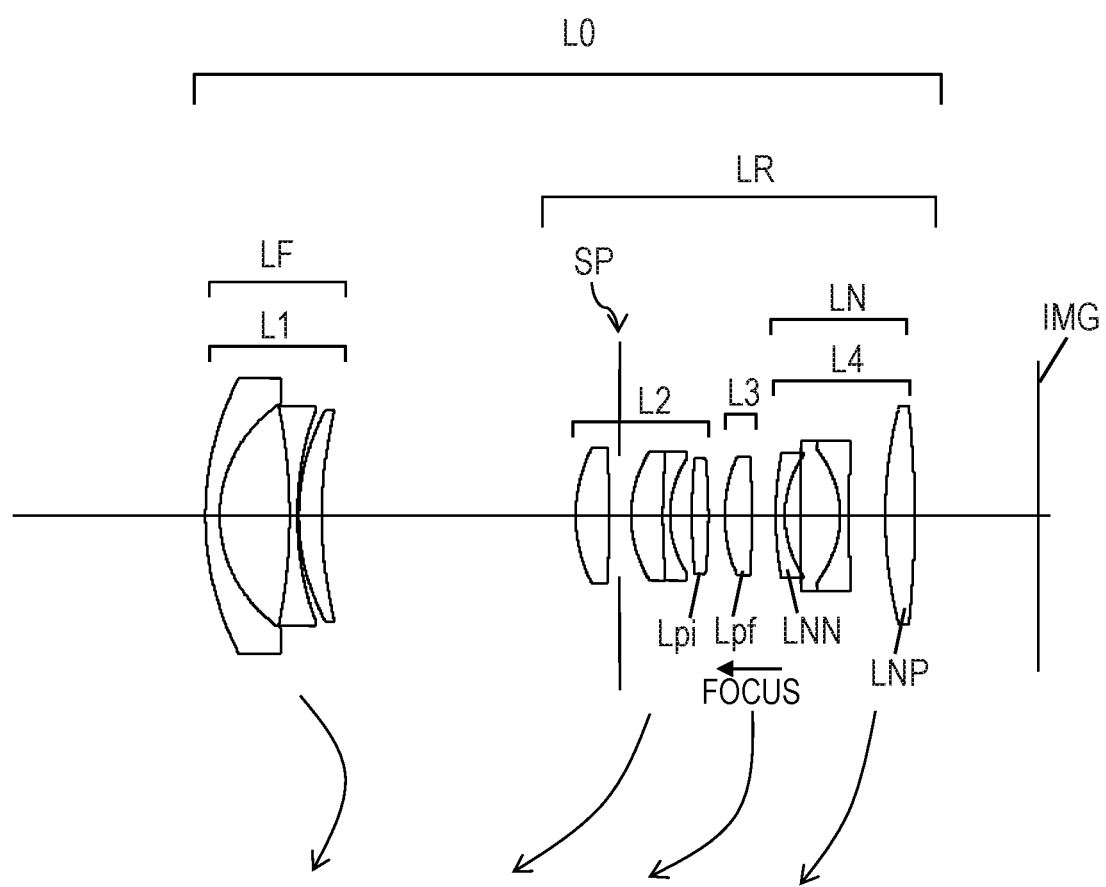
FIG. 1 is a lens sectional diagram of the zoom lens of Example 1 at a wide angle end.
Figure 2A:
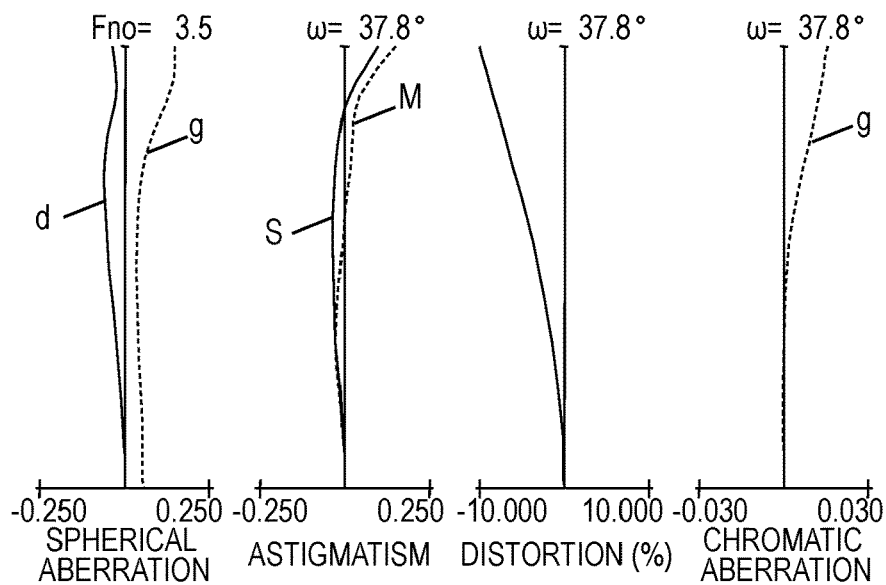
FIG. 2A is an aberration diagram of the zoom lens of Example 1 focused at infinity at the wide angle end.
Figure 2B:
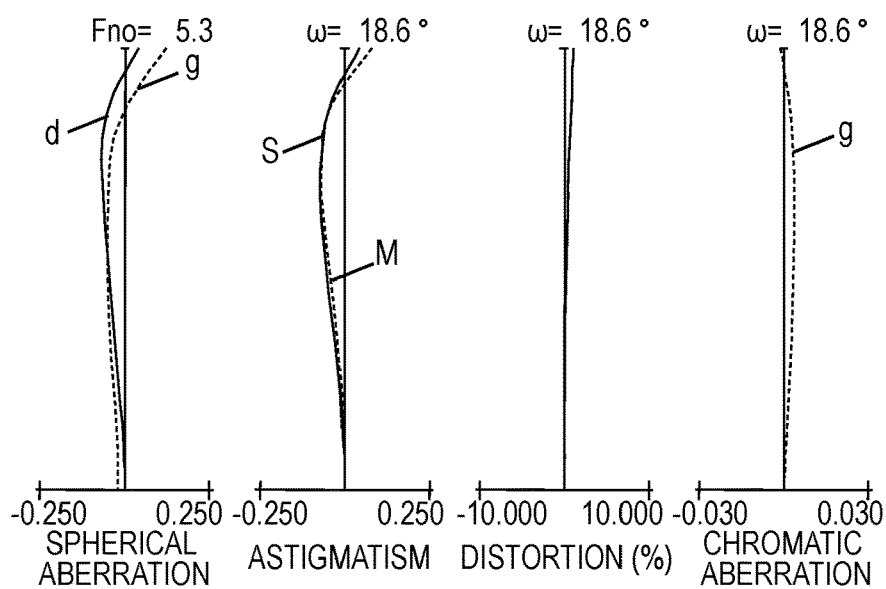
FIG. 2B is an aberration diagram of the zoom lens of Example 1 focused at infinity at the intermediate zoom position.
Figure 2C:
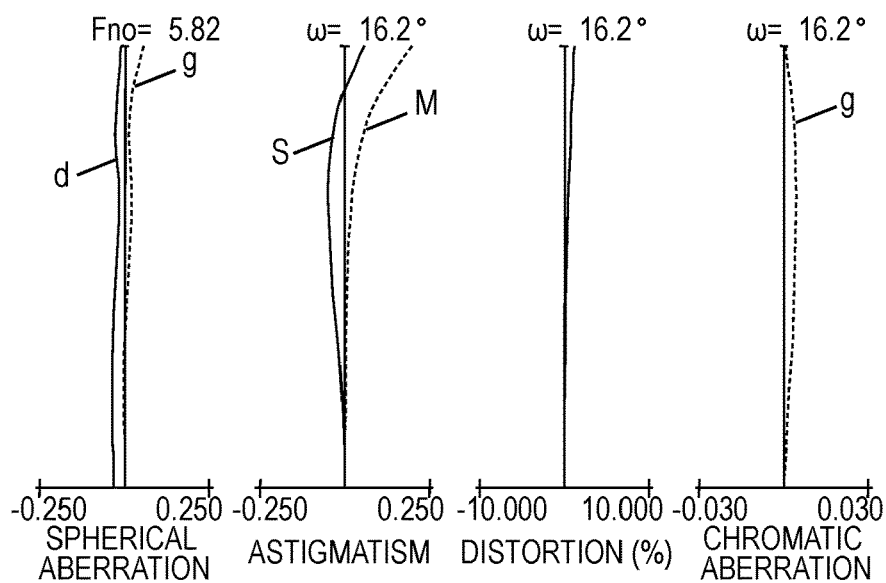
FIG. 2C is an aberration diagram of the zoom lens of Example 1 focused at infinity at the telephoto end.

FIG. 1 is a lens sectional diagram of the zoom lens of Example 1 at the wide angle end (a short focal length end). FIGS. 2A, 2B, and 2C are longitudinal aberration diagrams of the zoom lens of Example 1 focused at infinity at the wide angle end, at an intermediate zoom position, and at the telephoto end (a long focal length end), respectively. The zoom lens of Example 1 has a zoom ratio of 2.94 and an F-number of 3.50 to 5.82.

Figure 3:
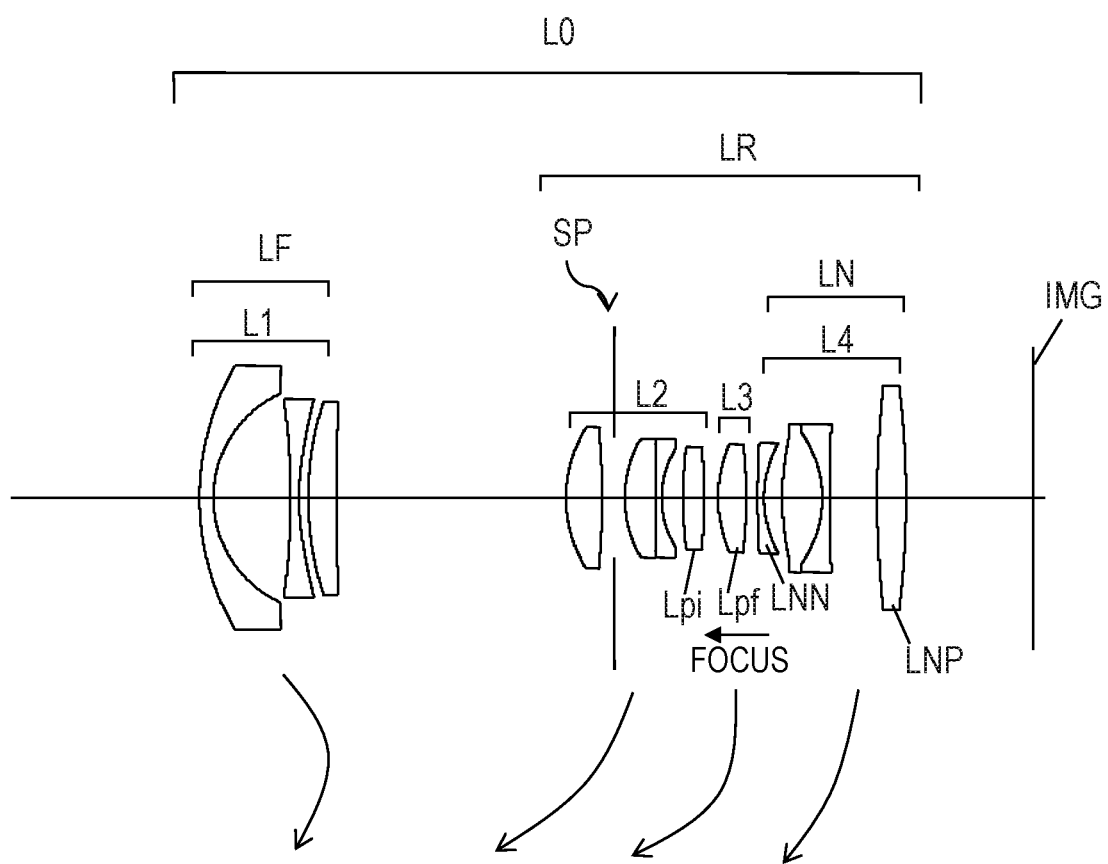
FIG. 3 is a lens sectional diagram of a zoom lens of Example 2 at the wide angle end.
Figure 4A:
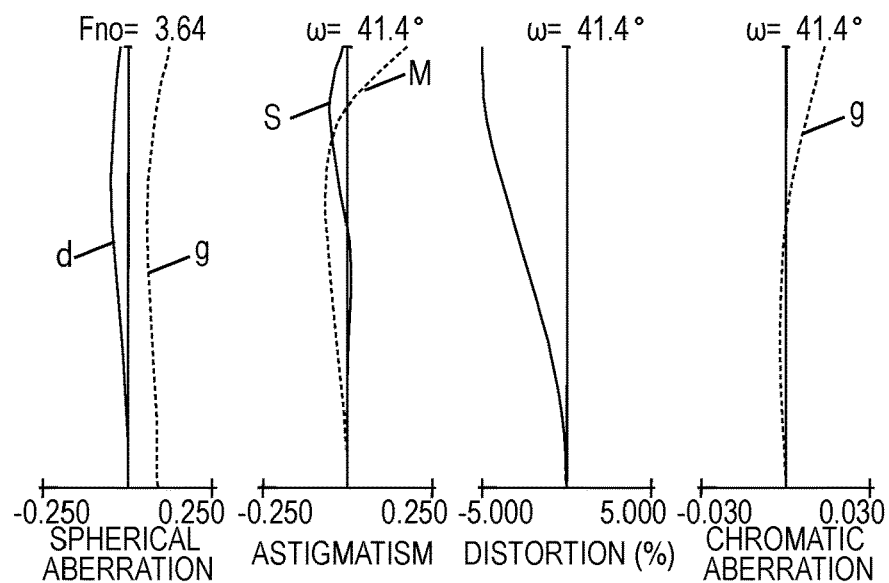
FIG. 4A is an aberration diagram of the zoom lens of Example 2 focused at infinity at the wide angle end.
Figure 4B:
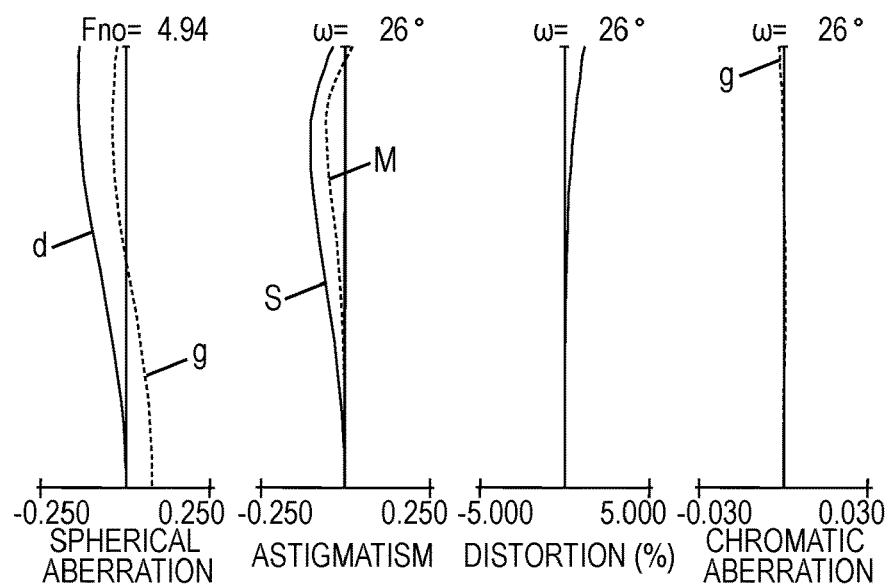
FIG. 4B is an aberration diagram of the zoom lens of Example 2 focused at infinity at the intermediate zoom position.
Figure 4C:
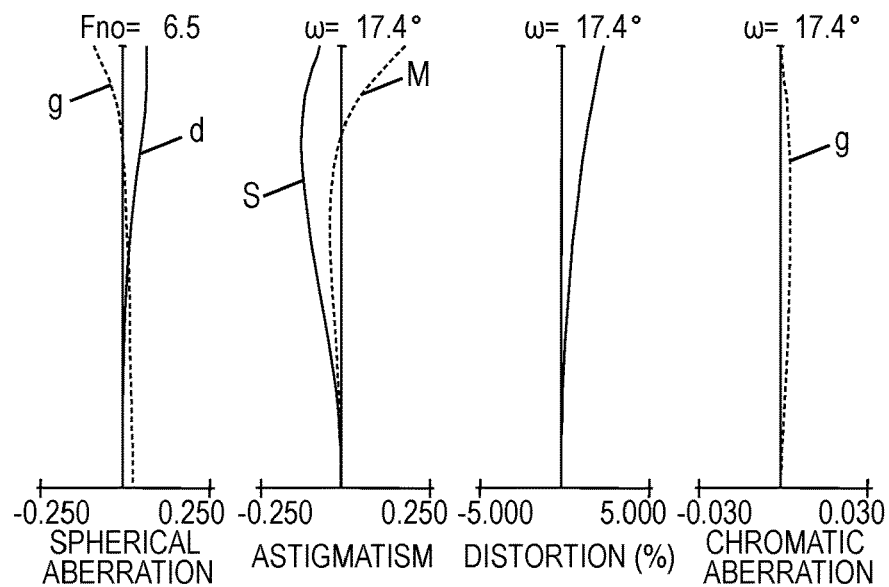
FIG. 4C is an aberration diagram of the zoom lens of Example 2 focused at infinity at the telephoto end.

FIG. 3 is a lens sectional diagram of the zoom lens of Example 2 at the wide angle end. FIGS. 4A, 4B, and 4C are longitudinal aberration diagrams of the zoom lens of Example 2 focused at infinity at the wide angle end, at the intermediate zoom position, and at the telephoto end, respectively. The zoom lens of Example 2 has a zoom ratio of 2.80 and an F-number of 3.64 to 6.50.

Figure 5:
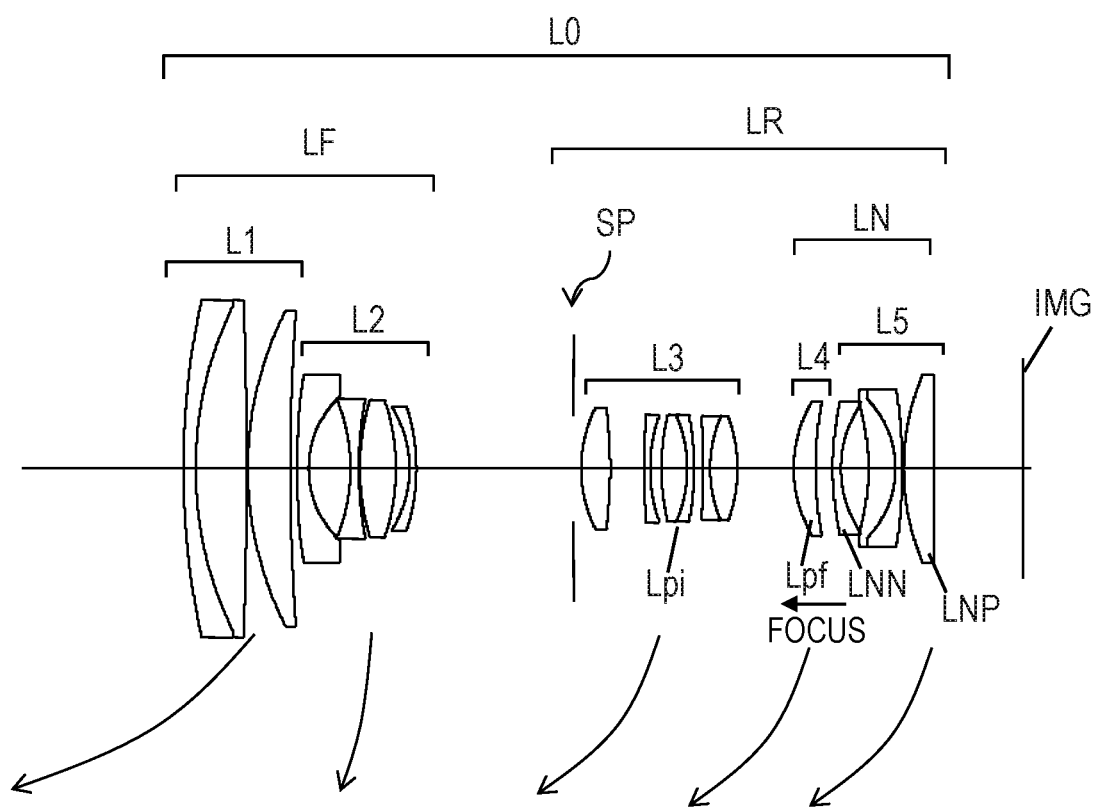
FIG. 5 is a lens sectional diagram of a zoom lens of Example 3 at the wide angle end.
Figure 6A:
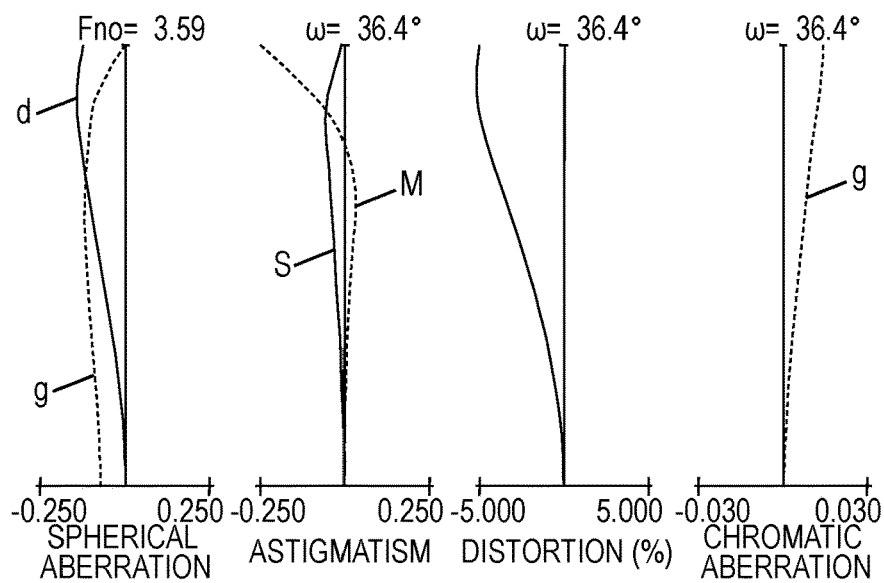
FIG. 6A is an aberration diagram of the zoom lens of Example 3 focused at infinity at the wide angle end.
Figure 6B:
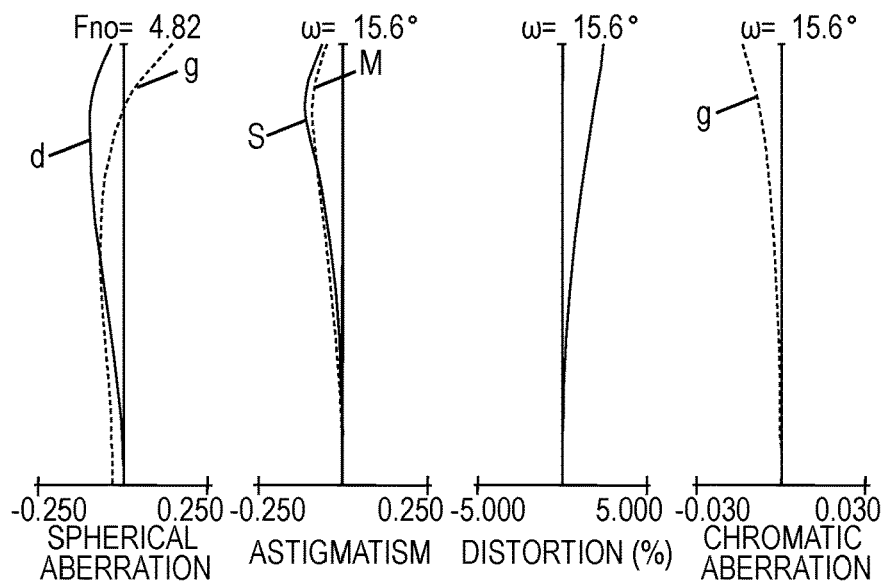
FIG. 6B is an aberration diagram of the zoom lens of Example 3 focused at infinity at the intermediate zoom position.
Figure 6C:
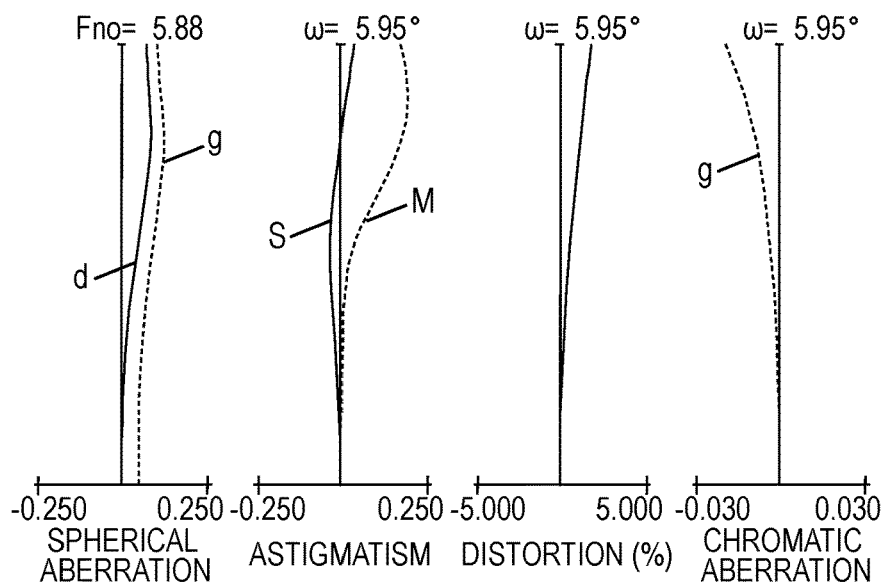
FIG. 6C is an aberration diagram of the zoom lens of Example 3 focused at infinity at the telephoto end.

FIG. 5 is a lens sectional diagram of the zoom lens of Example 3 at the wide angle end. FIGS. 6A, 6B, and 6C are longitudinal aberration diagrams of the zoom lens of Example 3 focused at infinity at the wide angle end, at the intermediate zoom position, and at the telephoto end, respectively. The zoom lens of Example 3 has a zoom ratio of 7.08 and an F-number of 3.59 to 5.88.

Figure 7:
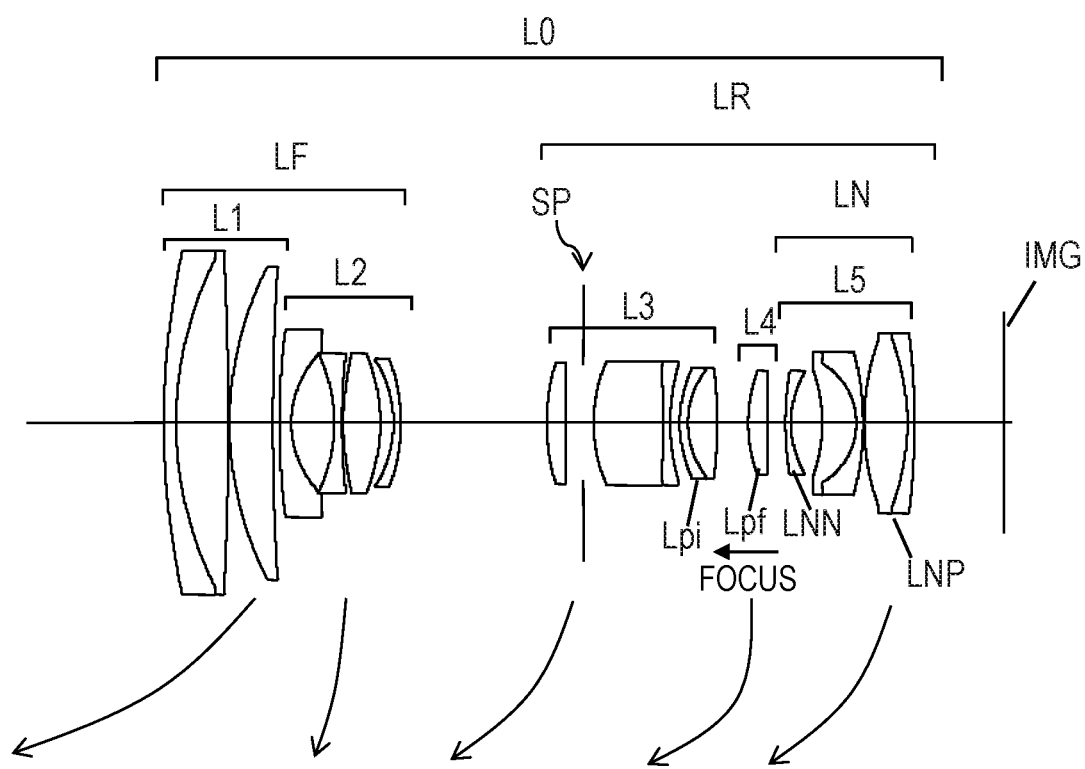
FIG. 7 is a lens sectional diagram of a zoom lens of Example 4 at the wide angle end.
Figure 8A:
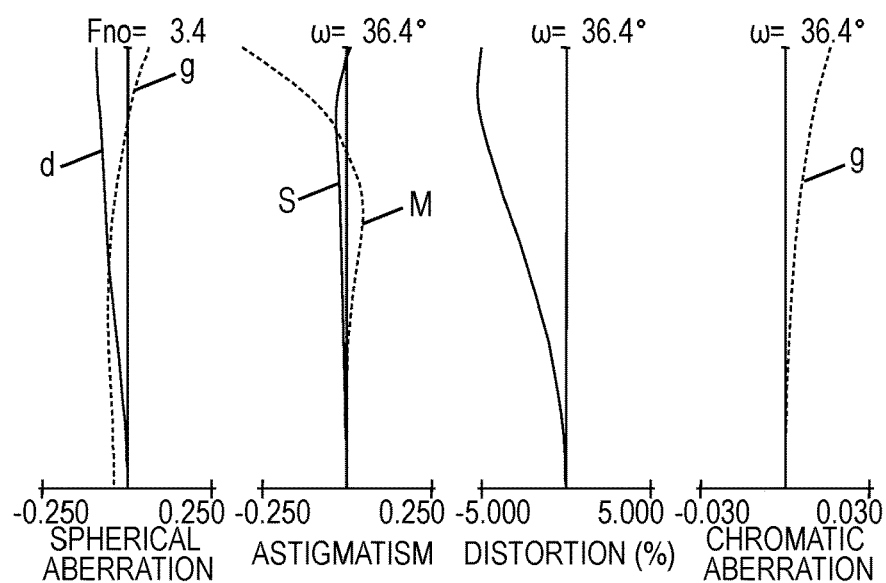
FIG. 8A is an aberration diagram of the zoom lens of Example 4 focused at infinity at the wide angle end.
Figure 8B:
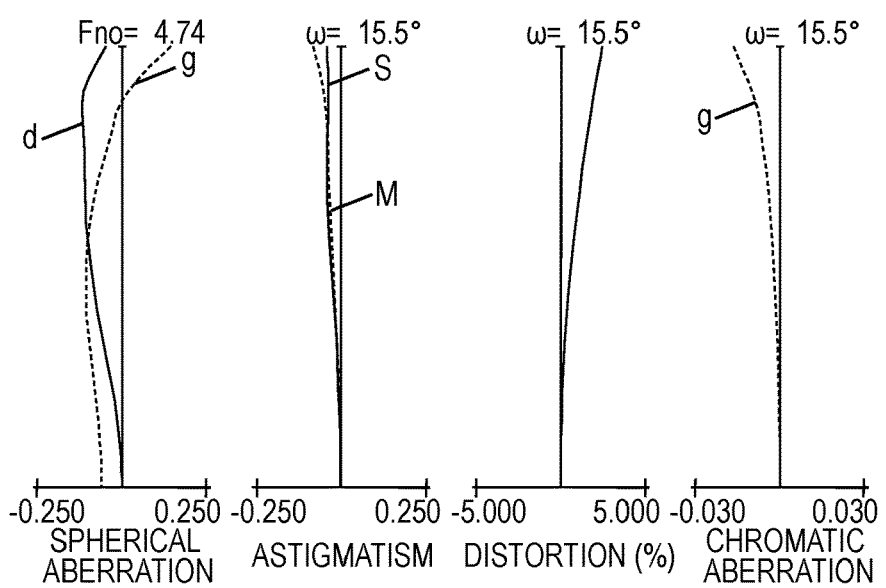
FIG. 8B is an aberration diagram of the zoom lens of Example 4 focused at infinity at the intermediate zoom position.
Figure 8C:
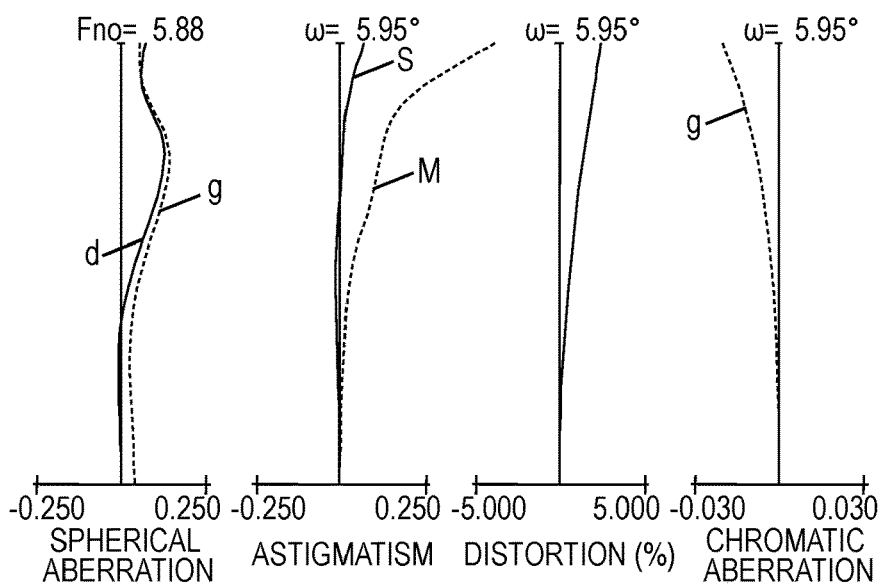
FIG. 8C is an aberration diagram of the zoom lens of Example 4 focused at infinity at the telephoto end.

FIG. 7 is a lens sectional diagram of the zoom lens of Example 4 at the wide angle end. FIGS. 8A, 8B, and 8C are longitudinal aberration diagrams of the zoom lens of Example 4 focused at infinity at the wide angle end, at the intermediate zoom position, and at the telephoto end, respectively. The zoom lens of Example 4 has a zoom ratio of 7.07 and an F-number of 3.40 to 5.88.

Figure 9:
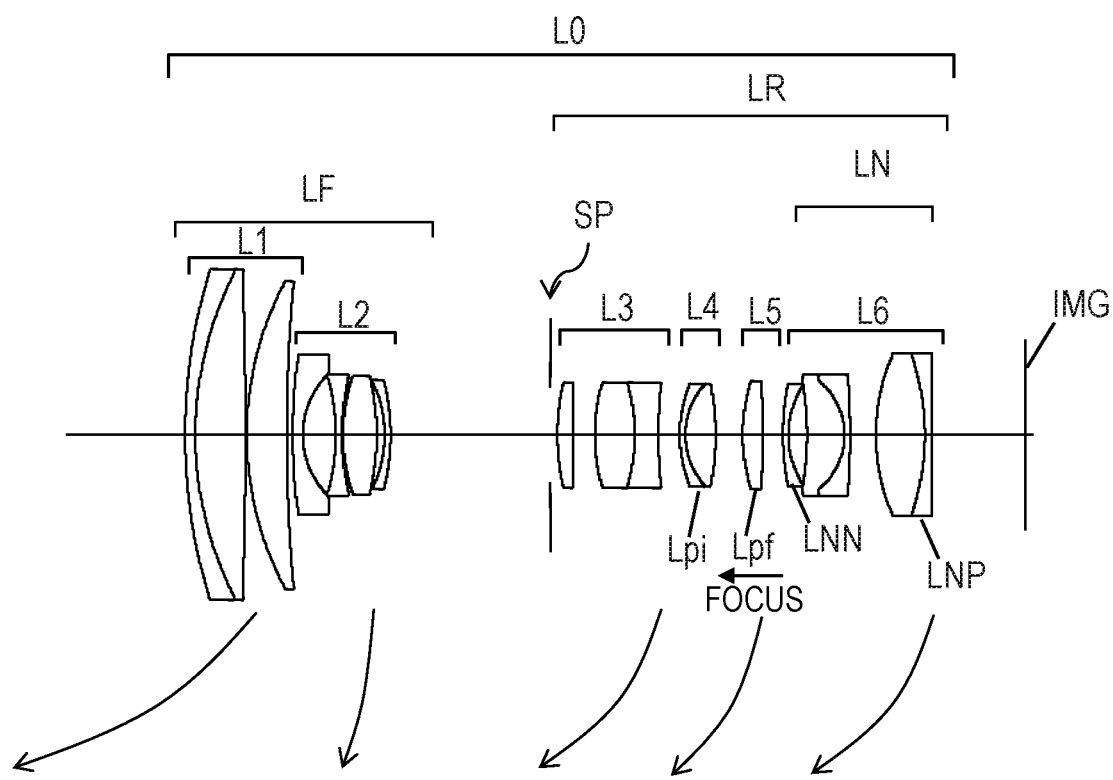
FIG. 9 is a lens sectional diagram of a zoom lens of Example 5 at the wide angle end.
Figure 10A:
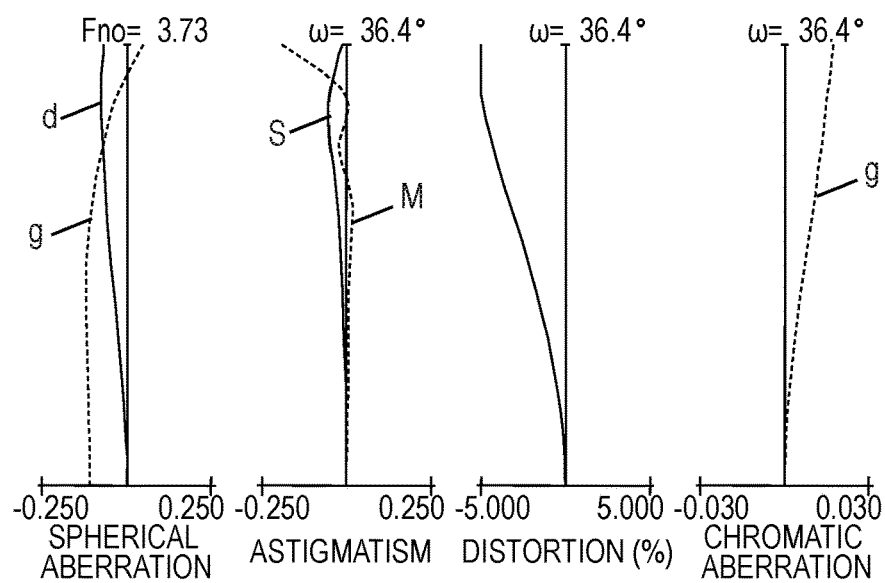
FIG. 10A is an aberration diagram of the zoom lens of Example 5 focused at infinity at the wide angle end.
Figure 10B:
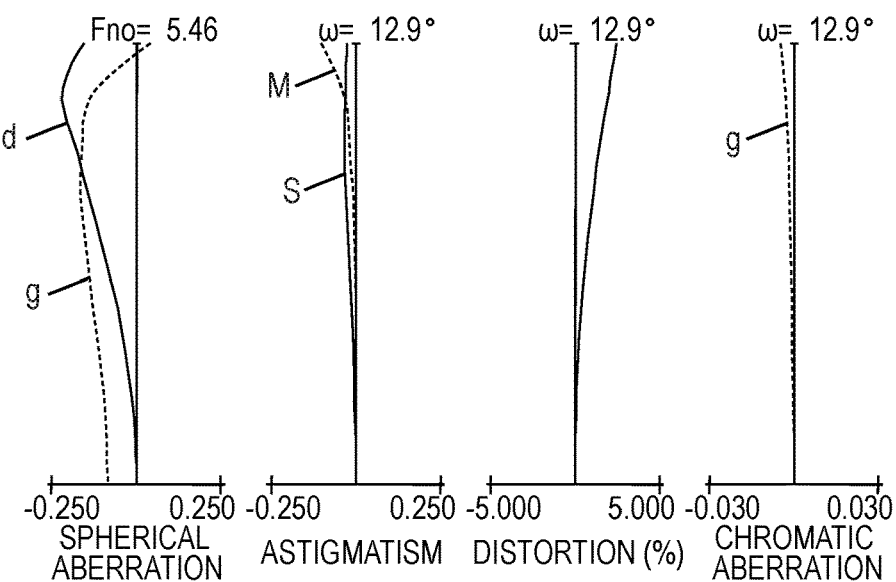
FIG. 10B is an aberration diagram of the zoom lens of Example 5 focused at infinity at the intermediate zoom position.
Figure 10C:
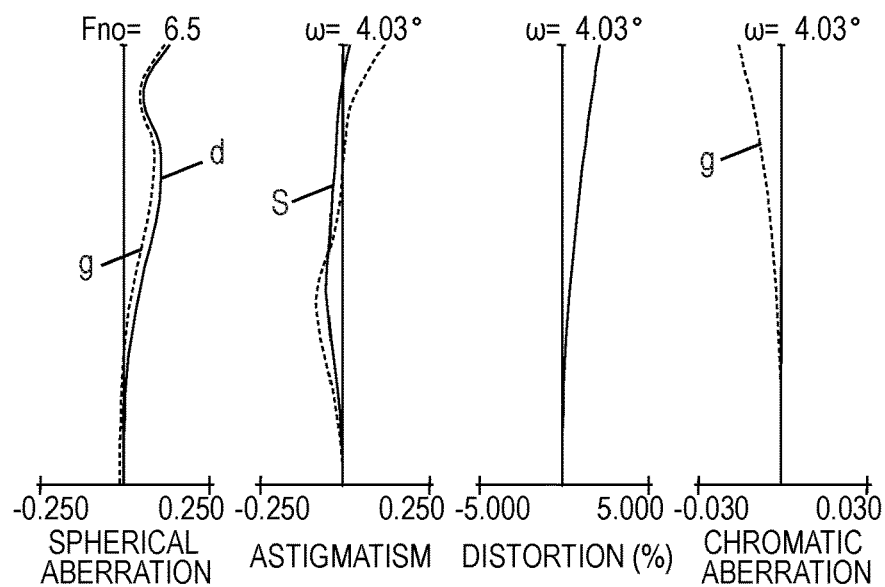
FIG. 10C is an aberration diagram of the zoom lens of Example 5 focused at infinity at the telephoto end.

FIG. 9 is a lens sectional diagram of the zoom lens of Example 5 at the wide angle end. FIGS. 10A, 10B, and 10C are longitudinal aberration diagrams of the zoom lens of Example 5 focused at infinity at the wide angle end, at the intermediate zoom position, and at the telephoto end, respectively. The zoom lens of Example 5 has a zoom ratio of 10.48 and an F-number of 3.73 to 6.50.

Figure 11:
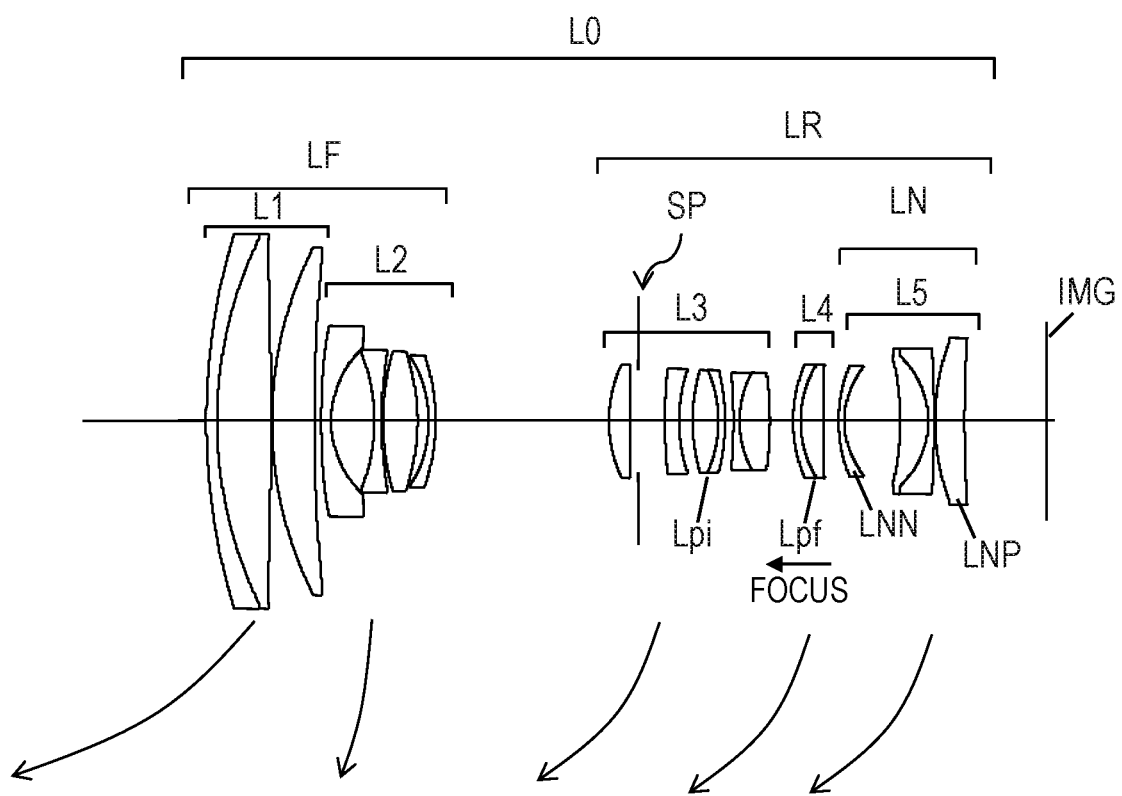
FIG. 11 is a lens sectional diagram of a zoom lens of Example 6 at the wide angle end.
Figure 12A:
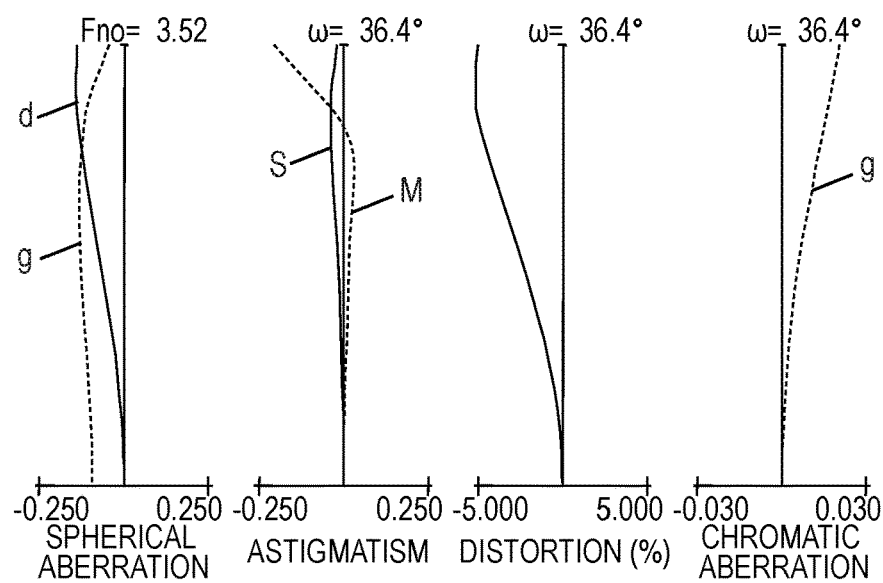
FIG. 12A is an aberration diagram of the zoom lens of Example 6 focused at infinity at the wide angle end.
Figure 12B:
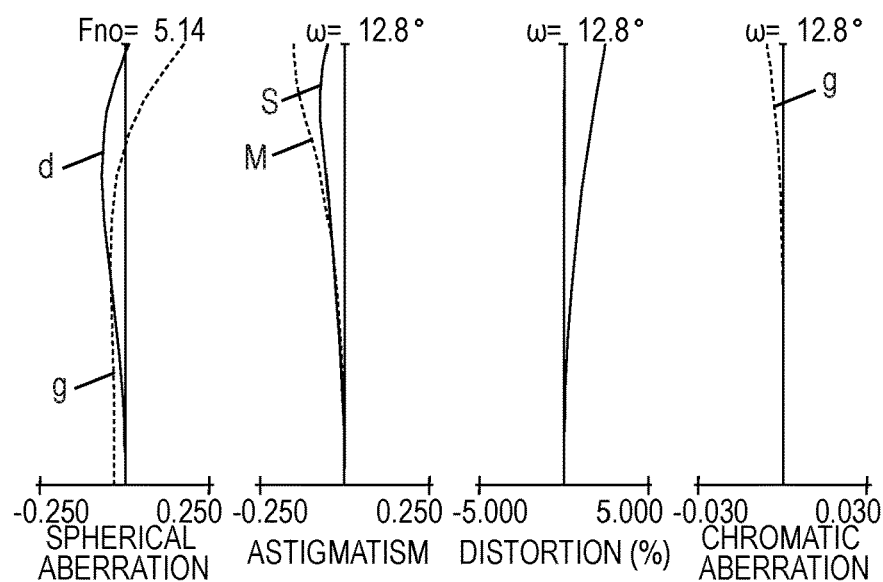
FIG. 12B is an aberration diagram of the zoom lens of Example 6 focused at infinity at the intermediate zoom position.
Figure 12C:
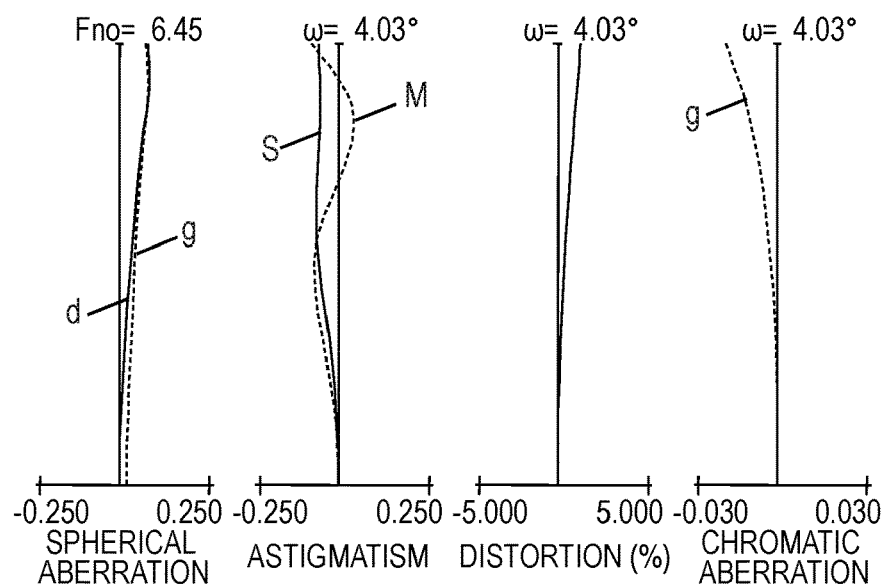
FIG. 12C is an aberration diagram of the zoom lens of Example 6 focused at infinity at the telephoto end.

FIG. 11 is a lens sectional diagram of the zoom lens of Example 6 at the wide angle end. FIGS. 12A, 12B, and 12C are longitudinal aberration diagrams of the zoom lens of Example 6 focused at infinity at the wide angle end, at the intermediate zoom position, and at the telephoto end, respectively. The zoom lens of Example 6 has a zoom ratio of 10.48 and an F-number of 3.52 to 6.45.

Figure 13:
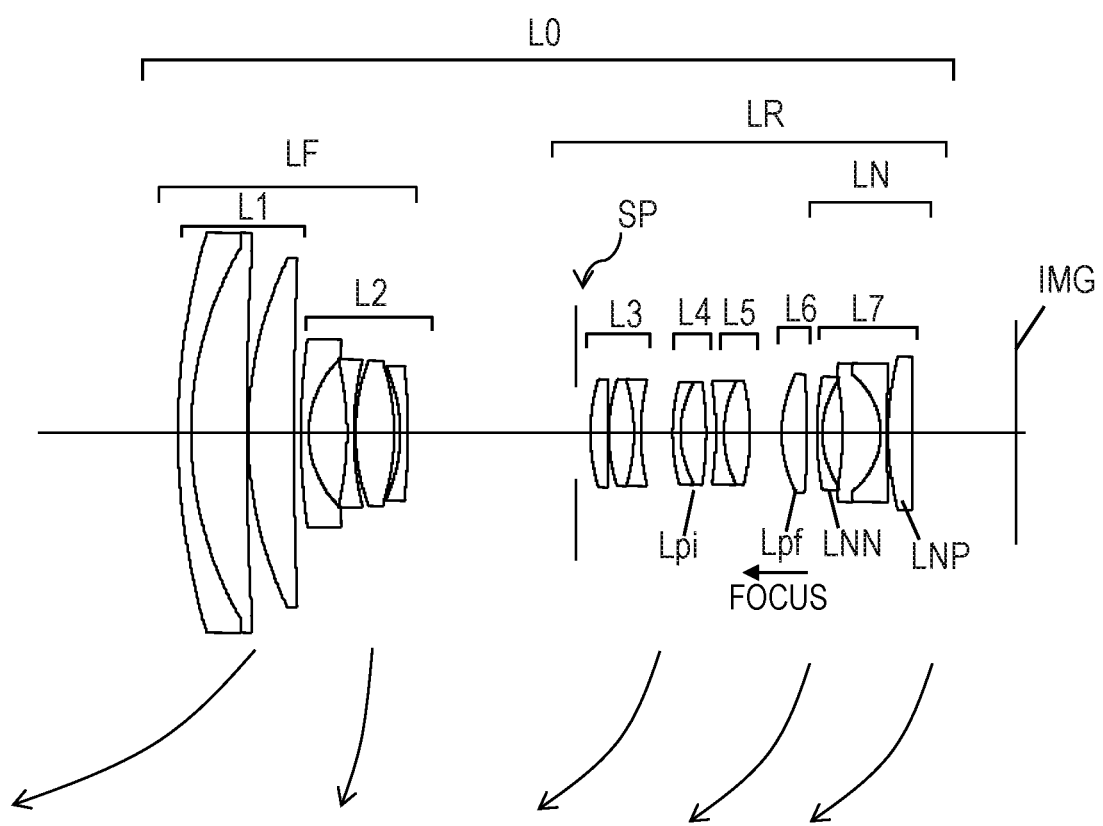
FIG. 13 is a lens sectional diagram of a zoom lens of Example 7 at the wide angle end.
Figure 14A:
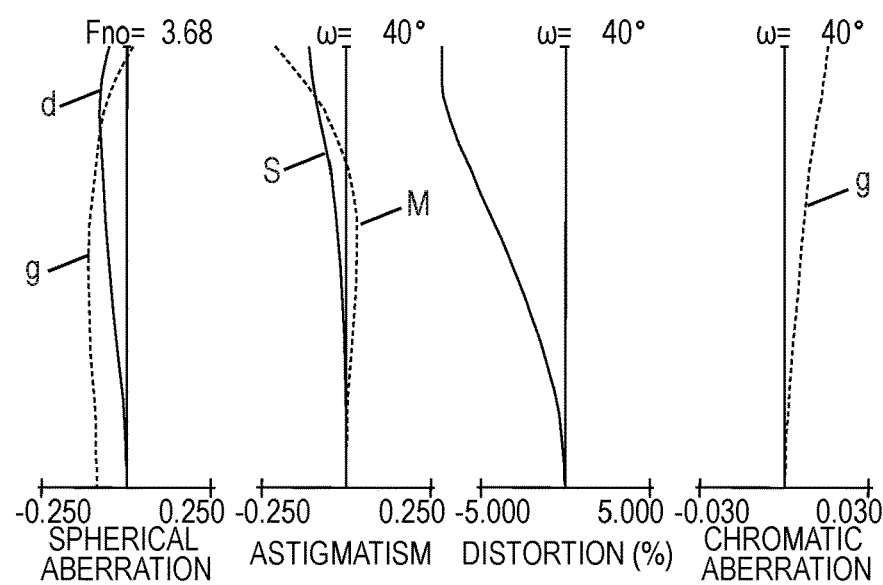
FIG. 14A is an aberration diagram of the zoom lens of Example 7 focused at infinity at the wide angle end.
Figure 14B:
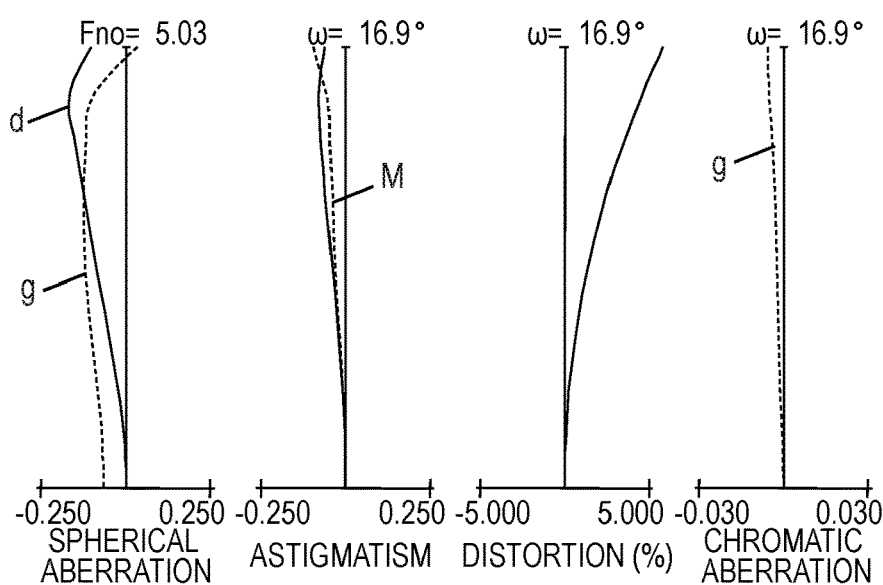
FIG. 14B is an aberration diagram of the zoom lens of Example 7 focused at infinity at the intermediate zoom position.
Figure 14C:
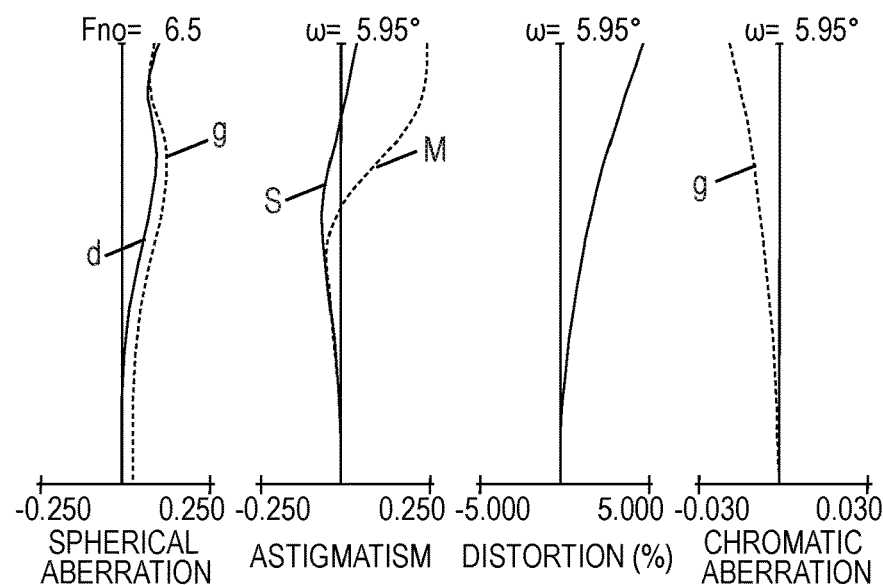
FIG. 14C is an aberration diagram of the zoom lens of Example 7 focused at infinity at the telephoto end.

FIG. 13 is a lens sectional diagram of the zoom lens of Example 7 at the wide angle end. FIGS. 14A, 14B, and 14C are longitudinal aberration diagrams of the zoom lens of Example 7 focused at infinity at the wide angle end, at the intermediate zoom position, and at the telephoto end, respectively. The zoom lens of Example 7 has a zoom ratio of 8.45 and an F-number of 3.68 to 6.50.

Figure 15:
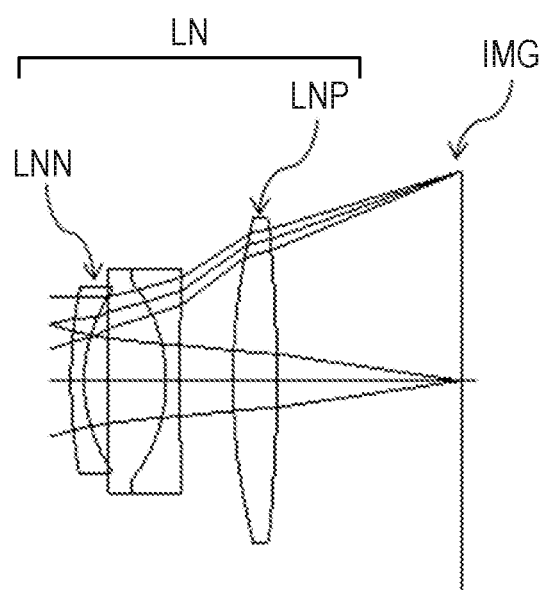
FIG. 15 is a diagram of optical paths through a lens system in a part of the zoom lens of Example 1.
Figure 16:
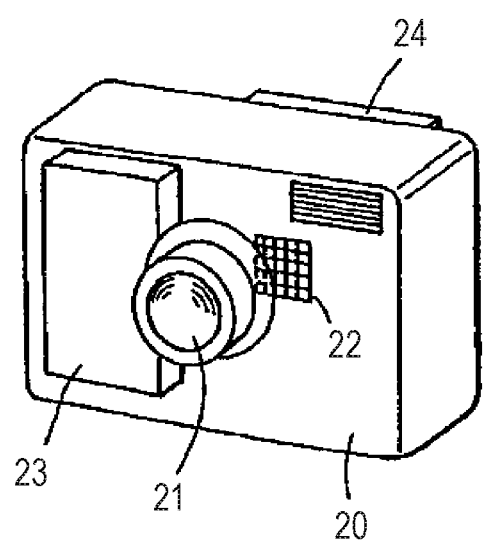
FIG. 16 is a schematic diagram of a main part of an image pickup apparatus according to an embodiment.

FIG. 15 is a diagram of optical paths through a lens system in a part of the zoom lens of Example 1. FIG. 16 is a schematic diagram of a main part of an image pickup apparatus according to an embodiment.

The zoom lens of each Example is an image pickup optical system (or an optical system) for use in an image pickup apparatus such as a video camera or a digital camera. In each lens sectional diagram, the left hand is the object side (or the front side), and the right hand is the image side (or the rear side). Note that the zoom lens of each Example may be used for a projector, in which case the left hand is the screen side, and the right hand is the projected image side.

In each lens sectional diagram, L0 represents a zoom lens. The front group LF includes at least one lens unit. The rear group LR includes a plurality of lens units. The order of a lens unit counted from the object side is represented by i. The i-th lens unit is represented by Li. An aperture stop (maximum aperture F-number stop) is represented by SP. An image plane is represented by IMG. The image plane corresponds to the imaging plane of a solid-state image pickup element (a photo-electric conversion element) such as a CCD or CMOS sensor when the zoom lens is used as an imaging optical system for a video camera or a digital still camera. The arrows indicate the directions in which the lens units move during zooming from the wide angle end to the telephoto end.

Lpf represents a focus lens unit. The arrow indicated by FOCUS indicates the direction in which a lens unit moves during focusing from infinity to close distance, and Lpi denotes a lens system for image blur correction.

Note that in each Example below, the wide angle end and the telephoto end refer to zoom positions which are available ends of the zoom range in which the lens units for varying magnification can move on an optical axis mechanically. In each aberration diagram, in the part showing spherical aberration, the solid line d and the broken line g represent d-line (587.6 nm) and g-line (435.8 nm), respectively. In the part showing astigmatism, the solid line S represents the sagittal direction of d-line, and the broken line M represents the meridional direction of d-line. Further, the part showing distortion indicates distortion for d-line. In the part showing the lateral chromatic aberration, the broken line represents lateral chromatic aberration for d-line. "Fno" represents an F-number, and "co" denotes a half angle of view (°).

In general, an arrangement in which a lens unit having a negative refractive power is disposed on the image side is what is called telephoto-type power (refractive power) arrangement, and such an arrangement makes it easy to shorten the total length of the zoom lens. However, when a lens unit having a negative refractive power is disposed closest to the image side, off-axial rays are incident on the image plane at large angles due to the divergence effect of the lens unit having a negative refractive power, making it difficult to obtain sufficient telecentricity. Disposing a positive lens on the image side is effective in obtaining sufficient telecentricity and makes it easy to obtain telecentricity due to convergence effect of the positive lens.

In the present invention, a lens unit LN having a negative refractive power is disposed closest to the image side, and the lens unit LN has a negative lens LNN disposed closest to the object side and a positive lens LNP disposed closest to the image side. Further, the thickness of the lens unit LN closest to the image side is sufficiently increased as illustrated in FIG. 15, so that rays diverged by the negative lens LNN can be converged by the positive lens LNP to obtain telecentricity effectively.

Specifically, the zoom lens of each Example consists of a front group LF including at least one lens unit and a rear group LR which is disposed at the image side of the front group LF and includes a plurality of lens units. The interval between the front group LF and the rear group LR on the optical axis is the longest among all the air intervals between adjacent ones of the lens units at the wide angle end, and intervals of the adjacent ones of the lens units change during zooming.

The front group LF has a negative refractive power at the wide angle end, and the rear group LR has a positive refractive power at the wide angle end. The rear group LR includes the lens unit LN having a negative refractive power closest to the image side. The lens unit LN includes a negative lens LNN closest to the object side among the lenses included in the lens unit LN and a positive lens LNP closest to the image side among the lenses included in the lens unit LN. The zoom lens satisfies the following conditional expressions:

$$-2.5 < fn/fw < -0.6, \text{ and} \tag{1}$$

$$0.9 < D/skw < 3.0 \tag{2}$$

where fn represents the focal length of the lens unit LN, fw represents the focal length of the zoom lens at the wide angle end, D represents the distance on the optical axis from a lens surface closest to the object side in the lens unit LN to a lens surface closest to the image side in the lens unit LN, and skw represents the back focal length at the wide angle end.

Next, technical meanings of the above conditional expressions are described. Conditional Expression (1) defines the ratio of the focal length of the lens unit LN to the focal length of the zoom lens at the wide angle end. If the ratio falls below the lower limit value of Conditional Expression (1) such that the negative refractive power of the lens unit LN is weak (or small in absolute value), increasing the total length of the zoom lens, it is not preferable. If the ratio exceeds the upper limit value of Conditional Expression (1), the lens unit LN generates various aberrations so much that it is difficult to correct the various aberrations, in particular, variation in coma associated with zooming becomes large, it is not preferable.

Conditional Expression (2) defines the relation between the thickness of the lens unit LN and the back focus. If the ratio exceeds the upper limit value in Conditional Expression (2) such that the lens unit LN is too thick, increasing the size of the lens unit LN, it is not preferable. If the ratio falls below the lower limit value in Conditional Expression (2), the lens unit LN is too thin, making it difficult to obtain sufficient telecentricity, it is not preferable.

It is more preferable when the numerical values in Conditional Expressions (1) and (2) are set as follows:

$$-1.68 < fn/fw < -0.95, \text{ and} \tag{1a}$$

$$0.91 < D/skw < 1.66. \tag{2a}$$

In each Example, it is even more preferable when the zoom lens satisfies at least one of the following conditional expressions:

$$-1.50 < ffw/frw < -0.65, \tag{3}$$

$$-5.0 < (R1LNN+R2LNN)/(R1LNN-R2LNN) < -0.8, \tag{4}$$

$$2.243 < NdLNN + vdLNN \times 0.01143 < 2.410, \text{ and} \tag{5}$$

$$1.1 < \beta LNt/\beta LNw < 1.9 \tag{6}$$

where ffw represents the focal length of the front group LF at the wide angle end, frw represents the focal length of the rear group LR at the wide angle end, R1LNN represents the curvature radius of the lens surface at the object side of the negative lens LNN, R2LNN represents the curvature radius of the lens surface at the image side of the negative lens LNN, NdLNN represents the refractive index of the material of the negative lens LNN, vdLNN represents the Abbe number of the material of the negative lens LNN, βLNw represents the imaging lateral magnification of the lens unit LN at the wide angle end, and βLNt represents the imaging lateral magnification of the lens unit LN at the telephoto end.

Next, technical meanings of the above conditional expressions are described. Conditional Expression (3) defines the ratio of the focal length of the front group LF to the focal length of the rear group LR. If the ratio exceeds the upper limit value of Conditional Expression (3) such that the focal length of the rear group LR is long, making it difficult to obtain sufficiently long back focus at the wide angle end, it is not preferable. If the ratio falls below the lower limit value of Conditional Expression (3) such that the negative focal length of the front group LF is large in absolute value, a moving amount of the front group LF becomes large during zooming from the wide angle end to the telephoto end and therefore makes it difficult to reduce the size of the zoom lens, it is not preferable.

Conditional Expression (4) defines the lens shape of the negative lens LNN. As illustrated in FIG. 15, axial rays incident on the negative lens LNN become convergent light. Thus, when the negative lens LNN has a strong concave surface facing toward the object side, a generation amount of spherical aberration is suppressed, making it easy to correct the spherical aberration. If the value exceeds the upper limit value in Conditional Expression (4) such that the curvature radius of the lens surface at the image side of the negative lens LNN is large in absolute value, it becomes difficult to give sufficient refractive power to the negative lens LNN and therefore makes the effect of reducing the total length of the zoom lens insufficient, it is not preferable. If the value falls below the lower limit value in Conditional Expression (4) such that the curvature radius of the lens surface at the image side of the negative lens LNN is small in absolute value, the spherical aberration becomes overcorrected, it is not preferable.

Conditional Expression (5) defines the relation between the refractive index and the Abbe number of the material of the negative lens LNN. If the value exceeds the upper limit value in Conditional Expression (5) such that the refractive index or the Abbe number is large, the number of appropriate optical materials decreases, it is not preferable. If the value falls below the lower limit value in Conditional Expression (5) such that the refractive index is small, correction of the Petzval sum becomes insufficient and the field curvature becomes over-corrected, it is not preferable. If the value falls below the lower limit value in Conditional Expression (5) such that the Abbe number is small, the negative lens LNN generates chromatic aberration so much that it is difficult to correct the chromatic aberration over the entire zoom range, it is not preferable.

Conditional Expression (6) defines the zooming share of the lens unit LN. If the ratio exceeds the upper limit value in Conditional Expression (6) such that the zooming share of the lens unit LN is large, a moving amount of the lens unit LN during zooming becomes large and therefore increases the size of the zoom lens, it is not preferable. If the ratio falls below the lower limit value in Conditional Expression (6) such that the zooming share of the lens unit LN is small, it becomes difficult to obtain a high zoom ratio, it is not preferable.

It is more preferable when the numerical values in Conditional Expressions (3) to (6) are set as follows:

$$-1.10 < ffw/frw < -0.65, \quad (3a)$$

$$-4.0 < (R1LNN + R2LNN)/(R1LNN - R2LNN) < -1.2, \quad (4a)$$

$$2.258 < NdLNN + vdLNN \times 0.01143 < 2.340, \text{ and} \quad (5a)$$

$$1.20 < \beta LNt/\beta LNw < 1.72. \quad (6a)$$

Next, other characteristics of the zoom lenses of the Examples are described. A lens unit Lpf having a positive refractive power is disposed at the object side of the lens unit LN adjacently to the lens unit LN. The lens unit Lpf moves during focusing. It is preferred that focusing is performed by the movement of the lens unit Lpf, the moving amount of the lens unit Lpf during focusing can be shortened by the effect of the lens unit LN having a negative refractive power, so that the size reduction of the zoom lens is facilitated. Further, the field curvature can be easily corrected because the lens unit Lpf having a positive refractive power and the lens unit LN having a negative refractive power can reduce the Petzval sum.

The zoom lens of each Example includes a lens system Lpi at the object side of the lens unit Lpf. For image blur correction, the lens system Lpi moves in a direction having a component perpendicular to the optical axis. Even a little vibration such as hand shake causes image blur and degrades image quality. Thus, the zoom lens preferably has what is called image stabilizing function to correct image blur upon a vibration such as hand shake. Image blur correction can reduce image blur by driving part of the lens system, namely the lens system Lpi, in a direction having a component perpendicular to the optical axis.

In each embodiment, the zoom lens includes the lens system Lpi having a positive refractive power at the object side of the lens unit LN, and image blur is reduced by driving the lens system Lpi in a direction having a component perpendicular to the optical axis.

The zoom lens of each Example has the lens unit LN having a strong negative refractive power arranged closest to the image side. Thus, by making the lens system for image blur correction have a positive refractive power, the refractive power arrangement of the lens units is made be appropriate.

Next, the lens configuration of each Example is described. In Example 1, the front group LF consists of a first lens unit L1 having a negative refractive power. The rear group LR consists of a second lens unit L2 having a positive refractive power, a third lens unit L3 having a positive refractive power, and a fourth lens unit L4 having a negative refractive power arranged in order from the object side to the image side.

Example 2 has the same zooming type, such as the number of lens units and the refractive powers of each lens units, as Example 1. In Example 3, the front group LF consists of a first lens unit L1 having a positive refractive power and a second lens unit L2 having a negative refractive power arranged in order from the object side to the image side. The rear group LR consists of a third lens unit L3 having a positive refractive power, a fourth lens unit L4 having a positive refractive power, and a fifth lens unit L5 having a negative refractive power arranged in order from the object side to the image side. Example 4 has the same zooming type as Example 3.

In Example 5, the front group LF consists of a first lens unit L1 having a positive refractive power and a second lens unit L2 having a negative refractive power arranged in order from the object side to the image side. The rear group LR consists of a third lens unit L3 having a positive refractive power, a fourth lens unit L4 having a positive refractive power, a fifth lens unit L5 having a positive refractive power, and a sixth lens unit L6 having a negative refractive power arranged in order from the object side to the image side. Example 6 has the same zooming type as Example 3.

In Example 7, the front group LF consists of a first lens unit L1 having a positive refractive power and a second lens unit L2 having a negative refractive power arranged in order from the object side to the image side. The rear group LR consists of a third lens unit L3 having a positive refractive power, a fourth lens unit L4 having a positive refractive power, a fifth lens unit L5 having a positive refractive power, a sixth lens unit L6 having a positive refractive power, and a seventh lens unit L7 having a negative refractive power arranged in order from the object side to the image side.

Next, an embodiment of a digital still camera employing the zoom lens of any of the Examples as an image pickup optical system is described by referring to FIG. 16.

In FIG. 16, a camera body 20 is illustrated. An image pickup system 21 is formed by the zoom lens described in any one of Examples 1 to 7. A solid-state image pickup element (a photo-electric conversion element) 22 such as a CCD or CMOS sensor is incorporated in the camera body 20 and receives light of a subject image formed by the image pickup optical system 21. Memory 23 stores information corresponding to the subject image photo-electrically converted by the solid-state image pickup element 22. A finder 24 is configured with a liquid crystal display panel or the like and is used for observing the subject image formed on the solid-state image pickup element 22.

By applying the zoom lens of each Example to an image pickup apparatus such as a digital still camera, a compact image pickup apparatus with high optical performance can be achieved. The zoom lens of each Example is similarly applicable to a single-lens reflex camera with a quick-return mirror or a mirror-less single-lens reflex camera without the quick-return mirror.

Although the preferred embodiments of a zoom lens have been described above, the present invention is of course not limited to these embodiments and can be variously modified or altered without departing from the gist thereof.

Numerical Examples 1 to 7 corresponding to the respective Examples 1 to 7 are described as follows. In each Numerical Example, i indicates the order of a surface counted from the object side. ri represents the curvature radius of the i-th lens surface from the object side. di represents the lens thickness and air interval between the i-th surface and the (i+1)-th surface from the object side. ndi and vdi represent the refractive index and the Abbe number, respectively, of the material of a lens between the i-th surface and the (i+1)-th surface from the object side. BF represents a back focus. With an X axis being the optical-axis direction, an H axis being perpendicular to the optical axis, a light travelling direction being positive, "R" being a paraxial curvature radius, and "K", "A2", "A4", "A6", "A8", and "A10" each being an aspherical coefficient, an aspherical shape is expressed as follows.

$$X = \frac{(1/R)}{1+\sqrt{1-(1+K)(H/R)^2}} + A_2H^2 + A_4H^4 + A_6H^6 + A_8H^8 + A_{10}H^{10}$$

In each aspherical coefficient, "e-x" indicates "$10^{-x}$". Further, specifications such as focal lengths and F-numbers are also described. The half angle of view means the half angle of view of the zoom lens, the image height means the maximum image height that determines the half angle of view, and the total length of the zoom lens indicates the distance from the first lens surface to the image plane. The back focus BF is the length from the last lens surface to the image plane. Further, each lens unit data provide the focal length of each lens unit.

Moreover, when an optical surface is denoted by "(variable)" under distance "d", it means the distance varying during zooming, and specific surface intervals associated with respective focal lengths are described in a separate table. Table 1 shows calculation results for the conditional expressions based on the lens data of Numerical Examples 1 to 7 described below.

Numerical Example 1

| Surface data | | | | |
| --- | --- | --- | --- | --- |
| Surface number | r | d | nd | vd |
| 1 | 26.656 | 1.25 | 1.77250 | 49.6 |
| 2 | 11.858 | 6.18 | | |
| 3 | −48.480 | 0.65 | 1.65160 | 58.5 |
| 4 | 27.410 | 0.15 | | |
| 5 | 19.712 | 2.04 | 2.00069 | 25.5 |
| 6 | 39.893 | (variable) | | |
| 7* | 12.302 | 2.92 | 1.55332 | 71.7 |
| 8* | −262.812 | 1.00 | | |
| 9 (stop) | ∞ | 1.00 | | |
| 10 | 10.894 | 2.78 | 1.49700 | 81.5 |
| 11 | 57.069 | 0.60 | 1.91082 | 35.3 |
| 12 | 9.110 | 1.95 | | |
| 13 | 51.299 | 1.45 | 1.65844 | 50.9 |
| 14 | −50.880 | (variable) | | |
| 15 | 13.417 | 2.34 | 1.59282 | 68.6 |
| 16 | −130.546 | (variable) | | |
| 17 | 29.191 | 0.80 | 1.58913 | 61.1 |
| 18 | 9.511 | 1.46 | | |
| 19 | −839.707 | 3.42 | 1.59551 | 39.2 |
| 20 | −9.442 | 0.80 | 1.83481 | 42.7 |
| 21 | 158.727 | 3.17 | | |
| 22 | 38.364 | 2.59 | 1.67790 | 55.3 |
| 23 | −96.108 | (variable) | | |
| image plane | ∞ | | | |

Numerical Example 2

| Aspheric surface data |
| --- |
| 7th surface |
| K = 0.00000e+000<br>A4 = −6.43690e−005<br>A6 = −4.37214e−007<br>A8 = −8.59583e−009<br>A10 = −5.13124e−010 |
| 8th surface |
| K = 0.00000e+000<br>A4 = −1.52160e−005<br>A6 = −2.01862e−007<br>A8 = −1.84795e−008<br>A10 = −3.66927e−010 |

| Various data<br>Zoom ratio 2.94 | | | |
| --- | --- | --- | --- |
| | Wide angle | Intermediate | Telephoto |
| Focal length | 16.00 | 40.49 | 47.04 |
| F-number | 3.50 | 5.30 | 5.82 |
| Half angle of view (deg.) | 37.77 | 18.64 | 16.19 |
| Image height | 12.40 | 13.66 | 13.66 |
| Total length of the zoom lens | 73.45 | 70.14 | 73.25 |
| BF | 10.94 | 22.37 | 26.27 |
| d6 | 22.36 | 2.57 | 0.95 |
| d14 | 1.45 | 2.47 | 2.76 |
| d16 | 2.15 | 6.17 | 6.73 |
| d23 | 10.94 | 22.37 | 26.27 |

| Zoom lens unit data | | |
| --- | --- | --- |
| Unit | Start surface | Focal length |
| 1 | 1 | −20.53 |
| 2 | 7 | 24.81 |
| 3 | 15 | 20.65 |
| 4 | 17 | −24.17 |

| Surface data | | | | |
| --- | --- | --- | --- | --- |
| Surface number | r | d | nd | vd |
| 1 | 23.696 | 1.25 | 1.77250 | 49.6 |
| 2 | 10.363 | 6.93 | | |
| 3 | −68.591 | 0.80 | 1.77250 | 49.5 |
| 4* | 25.840 | 0.80 | | |
| 5 | 28.152 | 2.51 | 1.84666 | 23.8 |
| 6 | 178.156 | (variable) | | |
| 7* | 11.677 | 3.28 | 1.55332 | 71.7 |
| 8* | −54.331 | 1.00 | | |
| 9 (stop) | ∞ | 1.00 | | |
| 10 | 10.499 | 2.73 | 1.49700 | 81.5 |
| 11 | −1879.960 | 0.60 | 1.85150 | 40.8 |
| 12 | 8.434 | 1.95 | | |
| 13 | 39.927 | 1.84 | 1.61340 | 44.3 |
| 14 | −77.117 | (variable) | | |
| 15 | 12.176 | 2.54 | 1.49700 | 81.5 |
| 16 | −41.029 | (variable) | | |
| 17 | 84.790 | 0.60 | 1.73400 | 51.5 |
| 18 | 10.310 | 1.63 | | |
| 19 | 25.892 | 3.59 | 1.51823 | 58.9 |
| 20 | −10.209 | 0.70 | 1.85150 | 40.8 |
| 21 | 187.725 | 4.26 | | |
| 22 | 100.265 | 2.59 | 2.00069 | 25.5 |
| 23 | −81.197 | (variable) | | |
| image plane | ∞ | | | |

-continued

Aspheric surface data

4th surface

K = 0.00000e+000
A4 = −3.45250e−005
A6 = −8.54250e−008
A8 = −6.17411e−010
A10 = −9.86572e−013

7th surface

K = 0.00000e+000
A4 = −5.29787e−005
A6 = 4.51842e−008
A8 = −7.65427e−009
A10 = 8.82410e−011

8th surface

K = 0.00000e+000
A4 = 2.61593e−005
A6 = 2.85787e−007
A8 = −8.47470e−009
A10 = 1.13957e−010

Various data
Zoom ratio 2.80

| | Wide angle | Intermediate | Telephoto |
|---|---|---|---|
| Focal length | 15.51 | 28.00 | 43.48 |
| F-number | 3.64 | 4.94 | 6.50 |
| Half angle of view (deg.) | 41.38 | 26.01 | 17.44 |
| Image height | 13.66 | 13.66 | 13.66 |
| Total length of the zoom lens | 75.09 | 71.52 | 75.03 |
| BF | 11.49 | 17.56 | 25.24 |
| d6 | 20.69 | 7.29 | 0.95 |
| d14 | 1.29 | 2.68 | 2.27 |
| d16 | 1.00 | 3.38 | 5.96 |
| d23 | 11.49 | 17.56 | 25.24 |

Zoom lens unit data

| Unit | Start surface | Focal length |
|---|---|---|
| 1 | 1 | −17.04 |
| 2 | 7 | 21.61 |
| 3 | 15 | 19.20 |
| 4 | 17 | −20.66 |

Numerical Example 3

Surface data

| Surface number | r | d | nd | vd |
|---|---|---|---|---|
| 1 | 98.939 | 1.50 | 1.95375 | 32.3 |
| 2 | 46.353 | 6.35 | 1.49700 | 81.5 |
| 3 | −551.560 | 0.15 | | |
| 4 | 43.233 | 5.25 | 1.67790 | 55.3 |
| 5 | 262.773 | (variable) | | |
| 6* | 121.432 | 1.40 | 1.83220 | 40.1 |
| 7 | 12.254 | 5.23 | | |
| 8 | −22.152 | 1.00 | 1.80400 | 46.6 |
| 9 | 44.415 | 0.15 | | |
| 10 | 28.967 | 4.49 | 1.85478 | 24.8 |
| 11 | −26.212 | 1.67 | | |
| 12 | −14.622 | 0.90 | 1.85150 | 40.8 |
| 13 | −24.092 | (variable) | | |
| 14 (stop) | ∞ | 1.00 | | |
| 15* | 16.202 | 3.63 | 1.58313 | 59.4 |
| 16* | −54.661 | 4.17 | | |
| 17 | 75.897 | 0.80 | 1.71300 | 53.9 |
| 18 | 19.749 | 1.37 | | |
| 19* | 26.914 | 3.26 | 1.58313 | 59.4 |
| 20 | −16.128 | 0.80 | 1.72047 | 34.7 |
| 21 | −36.429 | 1.20 | | |
| 22 | −80.390 | 0.80 | 1.91082 | 35.3 |
| 23 | 16.013 | 3.46 | 1.51823 | 58.9 |
| 24 | −17.976 | (variable) | | |
| 25 | 16.502 | 2.74 | 1.49700 | 81.5 |
| 26 | 47.769 | (variable) | | |
| 27 | 40.684 | 1.00 | 1.76802 | 49.2 |
| 28* | 14.030 | 3.41 | | |
| 29 | −29.288 | 3.38 | 1.64769 | 33.8 |
| 30 | −12.345 | 0.80 | 1.77250 | 49.6 |
| 31 | −71.547 | 0.22 | | |
| 32 | 30.475 | 3.80 | 1.59270 | 35.3 |
| 33 | −27143.757 | (variable) | | |
| image plane | ∞ | | | |

Aspheric surface data

6th surface

K = 0.00000e+000
A4 = 1.56125e−005
A6 = −1.46077e−008
A8 = −1.59750e−011
A10 = 1.28902e−012

15th surface

K = −1.67650e+000
A4 = 2.51019e−005
A6 = −6.26491e−009
A8 = 2.85233e−009
A10 = −4.01479e−012

16th surface

K = 0.00000e+000
A4 = 2.33556e−005
A6 = 4.78258e−008
A8 = 2.75332e−009
A10 = −9.18626e−012

19th surface

K = 0.00000e+000
A4 = −1.85100e−005
A6 = 6.63887e−008
A8 = 4.47635e−010
A10 = −2.00277e−011

28th surface

K = 0.00000e+000
A4 = −5.66498e−006
A6 = −6.09170e−008
A8 = −6.80892e−010
A10 = 1.28188e−011

Various data
Zoom ratio 7.08

| | Wide angle | Intermediate | Telephoto |
|---|---|---|---|
| Focal length | 18.51 | 49.01 | 130.98 |
| F-number | 3.59 | 4.82 | 5.88 |
| Half angle of view (deg.) | 36.43 | 15.57 | 5.95 |
| Image height | 13.66 | 13.66 | 13.66 |
| Total length of the zoom lens | 104.31 | 122.72 | 148.15 |
| BF | 10.99 | 24.52 | 36.57 |
| d5 | 0.90 | 18.66 | 37.59 |
| d13 | 19.43 | 6.56 | 1.00 |
| d24 | 6.96 | 4.24 | 7.88 |
| d26 | 2.12 | 4.84 | 1.20 |
| d33 | 10.99 | 24.52 | 36.57 |

-continued

| Zoom lens unit data | | |
| --- | --- | --- |
| Unit | Start surface | Focal length |
| 1 | 1 | 71.97 |
| 2 | 6 | −13.24 |
| 3 | 14 | 23.67 |
| 4 | 25 | 49.29 |
| 5 | 27 | −29.64 |

Numerical Example 4

| Surface data | | | | |
| --- | --- | --- | --- | --- |
| Surface number | r | d | nd | vd |
| 1 | 100.470 | 1.50 | 1.95375 | 32.3 |
| 2 | 44.988 | 6.46 | 1.49700 | 81.5 |
| 3 | −394.474 | 0.15 | | |
| 4 | 42.255 | 5.33 | 1.69680 | 55.5 |
| 5 | 309.974 | (variable) | | |
| 6* | 167.105 | 1.40 | 1.83220 | 40.1 |
| 7 | 12.387 | 5.28 | | |
| 8 | −19.980 | 1.00 | 1.91082 | 35.3 |
| 9 | 84.233 | 0.15 | | |
| 10 | 37.035 | 4.53 | 1.89286 | 20.4 |
| 11 | −22.741 | 1.65 | | |
| 12 | −14.585 | 0.90 | 2.00100 | 29.1 |
| 13 | −22.893 | (variable) | | |
| 14* | 26.286 | 2.29 | 1.58313 | 59.4 |
| 15* | 852.907 | 2.15 | | |
| 16 (stop) | ∞ | 1.35 | | |
| 17 | 19.531 | 8.63 | 1.57099 | 50.8 |
| 18 | −86.468 | 0.80 | 1.91082 | 35.3 |
| 19 | 24.707 | 1.20 | | |
| 20 | 16.065 | 1.00 | 1.84666 | 23.9 |
| 21 | 10.861 | 3.61 | 1.58313 | 59.4 |
| 22* | −48.371 | (variable) | | |
| 23* | 17.529 | 2.36 | 1.49710 | 81.6 |
| 24 | 563.712 | (variable) | | |
| 25 | 37.745 | 0.70 | 1.80400 | 46.6 |
| 26 | 12.672 | 3.87 | | |
| 27 | −18.981 | 4.21 | 1.59270 | 35.3 |
| 28 | −8.481 | 0.80 | 1.77250 | 49.6 |
| 29 | −35.114 | 0.15 | | |
| 30 | 31.177 | 5.32 | 1.59270 | 35.3 |
| 31 | −29.290 | 0.90 | 1.91082 | 35.3 |
| 32 | −89.126 | (variable) | | |
| image plane | ∞ | | | |

Aspheric surface data

6th surface $K = 0.00000e+000$
$A4 = 1.48583e-005$
$A6 = -2.61475e-008$
$A8 = 2.16828e-010$
$A10 = 2.78779e-013$ 14th surface $K = 0.00000e+000$
$A4 = -3.17509e-007$
$A6 = 1.88412e-007$
$A8 = -2.68426e-009$
$A10 = 1.49908e-011$ 15th surface $K = 0.00000e+000$
$A4 = 1.06856e-005$
$A6 = 2.10923e-007$
$A8 = -3.15590e-009$
$A10 = 1.77518e-011$ -continued 22th surface $K = 0.00000e+000$
$A4 = 3.16443e-005$
$A6 = 1.86714e-007$
$A8 = -7.26255e-009$
$A10 = 7.76031e-011$ 23th surface $K = 0.00000e+000$
$A4 = -2.76218e-005$
$A6 = 1.71253e-007$
$A8 = -1.56065e-008$
$A10 = 1.81299e-010$

| Various data Zoom ratio 7.07 | | | |
| --- | --- | --- | --- |
| | Wide angle | Intermediate | Telephoto |
| Focal length | 18.52 | 49.19 | 130.97 |
| F-number | 3.40 | 4.74 | 5.88 |
| Half angle of view (deg.) | 36.42 | 15.52 | 5.95 |
| Image height | 13.66 | 13.66 | 13.66 |
| Total length of the zoom lens | 103.61 | 121.85 | 146.78 |
| BF | 10.93 | 25.03 | 37.77 |
| d5 | 0.89 | 16.95 | 34.25 |
| d13 | 18.03 | 6.11 | 1.00 |
| d22 | 3.81 | 2.56 | 4.87 |
| d24 | 2.26 | 3.51 | 1.20 |
| d32 | 10.93 | 25.03 | 37.77 |

| Zoom lens unit data | | |
| --- | --- | --- |
| Unit | Start surface | Focal length |
| 1 | 1 | 66.84 |
| 2 | 6 | −12.81 |
| 3 | 14 | 21.97 |
| 4 | 23 | 36.34 |
| 5 | 25 | −20.31 |

Numerical Example 5

| Surface data | | | | |
| --- | --- | --- | --- | --- |
| Surface number | r | d | nd | vd |
| 1 | 78.949 | 1.50 | 1.95375 | 32.3 |
| 2 | 50.903 | 7.17 | 1.49700 | 81.5 |
| 3 | −620.866 | 0.15 | | |
| 4 | 46.738 | 5.70 | 1.49700 | 81.5 |
| 5 | 236.016 | (variable) | | |
| 6* | 105.709 | 1.40 | 1.83220 | 40.1 |
| 7 | 12.251 | 4.69 | | |
| 8 | −29.774 | 0.90 | 1.91082 | 35.3 |
| 9 | 37.940 | 0.15 | | |
| 10 | 26.634 | 4.79 | 1.89286 | 20.4 |
| 11 | −36.784 | 1.13 | | |
| 12* | −17.526 | 0.90 | 1.83220 | 40.1 |
| 13 | −30.108 | (variable) | | |
| 14 (stop) | ∞ | 1.00 | | |
| 15 | 32.905 | 2.27 | 1.84666 | 23.9 |
| 16 | 777.503 | 3.11 | | |
| 17 | 28.334 | 5.63 | 1.48749 | 70.2 |
| 18 | −28.058 | 3.42 | 2.00069 | 25.5 |
| 19 | 73.118 | (variable) | | |
| 20 | 19.291 | 0.80 | 1.76200 | 40.1 |
| 21 | 10.857 | 4.30 | 1.58313 | 59.4 |
| 22* | −37.578 | (variable) | | |
| 23* | 25.814 | 2.86 | 1.49710 | 81.6 |
| 24 | −90.644 | (variable) | | |
| 25 | 36.367 | 0.80 | 1.90366 | 31.3 |

-continued

| | | | | |
|---|---|---|---|---|
| 26 | 13.288 | 2.67 | | |
| 27 | −43.322 | 5.31 | 1.75211 | 25.1 |
| 28 | −9.967 | 0.80 | 1.85135 | 40.1 |
| 29 | −109.873 | 3.67 | | |
| 30 | 28.509 | 6.97 | 1.59270 | 35.3 |
| 31 | −36.033 | 1.00 | 1.80610 | 33.3 |
| 32 | 1368.702 | (variable) | | |
| image plane | ∞ | | | |

Aspheric surface data

6th surface

K = 0.00000e+000
A4 = 9.14513e−006
A6 = −7.38095e−009
A8 = −3.14416e−011
A10 = 7.39203e−013

12th surface

K = 0.00000e+000
A4 = −2.35381e−006
A6 = −9.69249e−009
A8 = −4.92156e−010
A10 = 3.34040e−012

22th surface

K = 0.00000e+000
A4 = 2.25602e−005
A6 = −3.52908e−009
A8 = −2.79217e−009
A10 = 2.25558e−011

23th surface

K = 0.00000e+000
A4 = −2.10517e−005
A6 = 1.04625e−007
A8 = −6.00169e−009
A10 = 6.71029e−011

Various data
Zoom ratio 10.48

| | Wide angle | Intermediate | Telephoto |
|---|---|---|---|
| Focal length | 18.51 | 59.64 | 193.98 |
| F-number | 3.73 | 5.46 | 6.50 |
| Half angle of view (deg.) | 36.43 | 12.90 | 4.03 |
| Image height | 13.66 | 13.66 | 13.66 |
| Total length of the zoom lens | 119.95 | 145.65 | 176.37 |
| BF | 13.43 | 31.04 | 44.18 |
| d5 | 0.90 | 24.06 | 47.27 |
| d13 | 22.74 | 7.67 | 2.04 |
| d19 | 3.02 | 1.56 | 1.12 |
| d22 | 3.90 | 3.56 | 7.39 |
| d24 | 2.86 | 4.66 | 1.26 |
| d32 | 13.43 | 31.04 | 44.18 |

Zoom lens unit data

| Unit | Start surface | Focal length |
|---|---|---|
| 1 | 1 | 80.64 |
| 2 | 6 | −12.84 |
| 3 | 14 | 58.94 |
| 4 | 20 | 26.61 |
| 5 | 23 | 40.75 |
| 6 | 25 | −23.32 |

Numerical Example 6

Surface data

| Surface number | r | d | nd | vd |
|---|---|---|---|---|
| 1 | 88.536 | 1.50 | 1.95375 | 32.3 |
| 2 | 57.884 | 7.39 | 1.49700 | 81.5 |
| 3 | −785.126 | 0.15 | | |
| 4 | 53.245 | 5.85 | 1.49700 | 81.5 |
| 5 | 254.799 | (variable) | | |
| 6* | 103.381 | 1.40 | 1.83220 | 40.1 |
| 7 | 13.852 | 5.94 | | |
| 8 | −25.557 | 1.00 | 1.83481 | 42.7 |
| 9 | 59.687 | 0.15 | | |
| 10 | 33.564 | 4.76 | 1.80809 | 22.8 |
| 11 | −30.301 | 1.59 | | |
| 12 | −16.774 | 0.90 | 1.83481 | 42.7 |
| 13 | −28.847 | (variable) | | |
| 14* | 17.522 | 3.00 | 1.58313 | 59.4 |
| 15* | −261.456 | 1.00 | | |
| 16 (stop) | ∞ | 3.74 | | |
| 17 | 70.206 | 1.95 | 1.65160 | 58.5 |
| 18 | 22.002 | 1.84 | | |
| 19* | 23.403 | 3.60 | 1.58313 | 59.4 |
| 20 | −17.070 | 0.86 | 1.78472 | 25.7 |
| 21 | −28.261 | 1.20 | | |
| 22 | −71.939 | 0.80 | 1.83481 | 42.7 |
| 23 | 13.892 | 4.15 | 1.51742 | 52.4 |
| 24 | −50.567 | (variable) | | |
| 25 | 20.349 | 1.00 | 1.78472 | 25.7 |
| 26 | 14.736 | 3.20 | 1.69680 | 55.5 |
| 27 | 334.260 | (variable) | | |
| 28 | 19.815 | 0.80 | 1.72000 | 50.2 |
| 29* | 11.529 | 7.66 | | |
| 30 | −38.970 | 3.88 | 1.67270 | 32.1 |
| 31 | −12.216 | 0.80 | 1.81600 | 46.6 |
| 32 | −168.935 | 0.15 | | |
| 33 | 32.156 | 4.03 | 1.59270 | 35.3 |
| 34 | 177.235 | (variable) | | |
| image plane | ∞ | | | |

Aspheric surface data

6th surface

K = 0.00000e+000
A4 = 8.78644e−006
A6 = 1.05152e−008
A8 = −1.14430e−010
A10 = 7.85577e−013

14th surface

K = −1.67650e+000
A4 = 2.40641e−005
A6 = −1.75453e−008
A8 = 2.04022e−009
A10 = −1.08825e−011

15th surface

K = 0.00000e+000
A4 = 6.89463e−006
A6 = 3.40018e−008
A8 = 1.89575e−009
A10 = −1.36559e−011

19th surface

K = 0.00000e+000
A4 = −2.54904e−005
A6 = 5.03830e−008
A8 = −5.69915e−010
A10 = −1.60179e−012

29th surface

K = 0.00000e+000
A4 = −2.04091e−005
A6 = −7.25882e−008

-continued

A8 = −2.97304e−009
A10 = 1.76166e−011

Various data
Zoom ratio 10.48

|  | Wide angle | Intermediate | Telephoto |
|---|---|---|---|
| Focal length | 18.51 | 59.97 | 193.99 |
| F-number | 3.52 | 5.14 | 6.45 |
| Half angle of view (deg.) | 36.43 | 12.83 | 4.03 |
| Image height | 13.66 | 13.66 | 13.66 |
| Total length of the zoom lens | 115.66 | 144.95 | 181.92 |
| BF | 11.33 | 25.27 | 41.74 |
| d5 | 0.90 | 27.72 | 53.40 |
| d13 | 23.85 | 7.38 | 1.00 |
| d24 | 3.24 | 5.21 | 10.29 |
| d27 | 2.05 | 5.09 | 1.20 |
| d34 | 11.33 | 25.27 | 41.74 |

Zoom lens unit data

| Unit | Start surface | Focal length |
|---|---|---|
| 1 | 1 | 91.97 |
| 2 | 6 | −14.20 |
| 3 | 14 | 29.44 |
| 4 | 25 | 32.45 |
| 5 | 28 | −29.02 |

Numerical Example 7

Surface data

| Surface number | r | d | nd | vd |
|---|---|---|---|---|
| 1 | 86.487 | 1.60 | 1.95375 | 32.3 |
| 2 | 45.458 | 6.82 | 1.49700 | 81.5 |
| 3 | 428.156 | 0.15 |  |  |
| 4 | 49.811 | 5.59 | 1.69680 | 55.5 |
| 5 | 527.493 | (variable) |  |  |
| 6 | 79.128 | 1.00 | 2.00100 | 29.1 |
| 7 | 12.802 | 4.66 |  |  |
| 8 | −38.413 | 0.80 | 1.91082 | 35.3 |
| 9 | 37.020 | 0.25 |  |  |
| 10 | 25.973 | 4.72 | 1.89286 | 20.4 |
| 11 | −26.884 | 0.70 |  |  |
| 12 | −20.188 | 1.00 | 1.91082 | 35.3 |
| 13 | −66.336 | (variable) |  |  |
| 14 (stop) | ∞ | 1.74 |  |  |
| 15* | 22.321 | 2.11 | 1.68893 | 31.2 |
| 16 | 817.402 | 0.15 |  |  |
| 17 | 20.916 | 3.09 | 1.57501 | 41.5 |
| 18 | −21.606 | 0.80 | 1.77250 | 49.6 |
| 19 | 26.440 | (variable) |  |  |
| 20 | 23.697 | 1.00 | 1.78472 | 25.7 |
| 21 | 12.718 | 3.08 | 1.58313 | 59.4 |
| 22* | −40.000 | (variable) |  |  |
| 23 | −41.886 | 1.00 | 1.74077 | 27.8 |
| 24 | 14.194 | 3.14 | 1.65844 | 50.9 |
| 25 | −29.112 | (variable) |  |  |
| 26* | 14.820 | 3.12 | 1.49710 | 81.6 |
| 27* | −99.890 | (variable) |  |  |
| 28 | 35.562 | 0.70 | 1.83400 | 37.2 |
| 29 | 11.856 | 2.47 |  |  |
| 30 | −34.612 | 4.60 | 1.59270 | 35.3 |
| 31 | −9.130 | 0.80 | 1.77250 | 49.6 |
| 32 | 287.830 | 0.15 |  |  |
| 33 | 39.508 | 2.90 | 1.89286 | 20.4 |
| 34 | 3118.991 | (variable) |  |  |
| image plane | ∞ |  |  |  |

Aspheric surface data

15th surface

K = 0.00000e+000
A4 = −2.99366e−006
A6 = −6.88496e−008
A8 = 2.38004e−009
A10 = −2.25075e−011

22th surface

K = 0.00000e+000
A4 = 1.75913e−005
A6 = −4.44467e−008
A8 = −2.41602e−010
A10 = 8.89749e−012

26th surface

K = 0.00000e+000
A4 = −2.72887e−005
A6 = −4.11248e−008
A8 = −5.93343e−009
A10 = −1.30173e−010

27th surface

K = 0.00000e+000
A4 = 2.13547e−005
A6 = 4.28197e−008
A8 = −1.10930e−008
A10 = −6.22477e−011

Various data
Zoom ratio 8.45

|  | Wide angle | Intermediate | Telephoto |
|---|---|---|---|
| Focal length | 15.51 | 45.00 | 130.98 |
| F-number | 3.68 | 5.03 | 6.50 |
| Half angle of view (deg.) | 39.97 | 16.89 | 5.95 |
| Image height | 13.00 | 13.66 | 13.66 |
| Total length of the zoom lens | 102.27 | 120.85 | 148.18 |
| BF | 12.76 | 23.92 | 35.17 |
| d5 | 0.80 | 22.02 | 43.58 |
| d13 | 20.44 | 6.65 | 1.17 |
| d19 | 3.87 | 2.15 | 1.20 |
| d22 | 1.20 | 2.92 | 3.87 |
| d25 | 3.86 | 2.71 | 3.85 |
| d27 | 1.20 | 2.35 | 1.20 |
| d34 | 12.76 | 23.92 | 35.17 |

Zoom lens unit data

| Unit | Start surface | Focal length |
|---|---|---|
| 1 | 1 | 80.14 |
| 2 | 6 | −12.71 |
| 3 | 14 | 40.74 |
| 4 | 20 | 31.88 |
| 5 | 23 | 3215.18 |
| 6 | 26 | 26.20 |
| 7 | 28 | −15.58 |

TABLE 1

Conditional Expression

|  | (1) | (2) | (3) | (4) | (5) | (6) |
|---|---|---|---|---|---|---|
| Example 1 | −1.510 | 1.118 | −1.017 | −1.967 | 2.288 | 1.326 |
| Example 2 | −1.333 | 1.164 | −0.820 | −1.277 | 2.322 | 1.298 |
| Example 3 | −1.601 | 1.148 | −0.841 | −2.053 | 2.331 | 1.499 |
| Example 4 | −1.097 | 1.459 | −0.869 | −2.011 | 2.336 | 1.615 |
| Example 5 | −1.260 | 1.580 | −0.723 | −2.152 | 2.262 | 1.574 |
| Example 6 | −1.568 | 1.528 | −0.830 | −3.783 | 2.294 | 1.588 |
| Example 7 | −1.005 | 0.911 | −0.855 | −2.000 | 2.259 | 1.635 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126009, filed Jun. 28, 2017, which is hereby incorporated by reference herein in its entirety.

What is claimed is:

1. A zoom lens comprising a plurality of lens units, intervals between adjacent ones of all of the plurality of lens units being changed during zooming, wherein
the plurality of lens units consist of a front group including at least one lens unit and a rear group disposed at an image side of the front group and including at least two lens units,
an interval between the front group and the rear group on an optical axis is the longest among all the intervals between the adjacent ones of the plurality of lens units at a wide angle end,
the front group has a negative refractive power at the wide angle end,
the rear group has a positive refractive power at the wide angle end,
the rear group comprises a lens unit LN having a negative refractive power and disposed closest to an image plane,
the lens unit LN comprises a plurality of lenses including a negative lens LNN disposed closest to an object in the lens unit LN and a positive lens LNP disposed closest to the image plane, intervals between adjacent ones of all of the plurality of lenses not being changed during zooming, and
the following conditional expressions are satisfied:

$-1.68 < fn/fw < -0.95$, and $0.9 < D/skw < 3.0$ where fn represents a focal length of the whole lens unit LN, fw represents a focal length of the zoom lens at the wide angle end, D represents a distance on the optical axis from an object-side surface of the negative lens LNN to an image-side surface of the positive lens LNP, and skw represents a distance on the optical axis from the image-side surface of the positive lens LNP to the image plane at the wide angle end.

2. The zoom lens according to claim 1, wherein the rear group comprises a lens unit Lpf having a positive refractive power and disposed adjacent to the lens unit LN at an object side of the lens unit LN, and the lens unit Lpf moves during focusing.

3. The zoom lens according to claim 2, wherein the rear group comprises a lens system Lpi disposed at the object side of the lens unit Lpf, and
the lens system Lpi moves in a direction including a component perpendicular to the optical axis during image blur correction.

4. The zoom lens according to claim 1, wherein the following conditional expression is satisfied:

$-1.50 < ffw/frw < -0.65$ where ffw represents a focal length of the front group at the wide angle end, and frw represents a focal length of the rear group at the wide angle end.

5. The zoom lens according to claim 1, wherein the following conditional expression is satisfied:

$2.243 < NdLNN + vdLNN \times 0.01143 < 2.410$ where NdLNN represents a refractive index of a material of the negative lens LNN, and vdLNN represents an Abbe number of the material of the negative lens LNN.

6. The zoom lens according to claim 1, wherein the following conditional expression is satisfied:

$1.1 < \beta LNt/\beta LNw < 1.9$ where βLNw represents an imaging lateral magnification of the lens unit LN at the wide angle end, and βLNt represents an imaging lateral magnification of the lens unit LN at a telephoto end.

7. The zoom lens according to claim 1, wherein the front group consists of a first lens unit having a positive refractive power and a second lens unit having a negative power arranged in order from an object side to the image side.

8. The zoom lens according to claim 7, wherein the rear group consists of a third lens unit having a positive refractive power, a fourth lens unit having a positive refractive power, and the lens unit LN arranged in order from an object side to the image side.

9. The zoom lens according to claim 7, wherein the rear group consists of a third lens unit having a positive refractive power a fourth lens unit having a positive refractive power, a fifth lens unit having a positive refractive power, and the lens unit LN arranged in order from the object side to the image side.

10. An image pickup apparatus comprising:
the zoom lens according to claims 1; and
an image pickup element that receives light from the zoom lens.

11. A zoom lens comprising a plurality of lens units, intervals between adjacent ones of all of the plurality of lens units being changed during zooming, wherein
the plurality of lens units consist of a front group including at least one lens unit and a rear group disposed at an image side of the front group and including at least two lens units,
an interval between the front group and the rear group on an optical axis is the longest among all the intervals between the adjacent ones of the plurality of lens units at a wide angle end,
the front group has a negative refractive power at the wide angle end,
the front group consists of a first lens unit having a negative refractive power,
the rear group has a positive refractive power at the wide angle end,
the rear group comprises a lens unit LN having a negative refractive power and disposed closest to an image plane,
the lens unit LN comprises a plurality of lenses including a negative lens LNN disposed closest to an object in the lens unit LN and a positive lens LNP disposed closest to the image plane, intervals between adjacent ones of all of the plurality of lenses not being changed during zooming, and
the following conditional expressions are satisfied:

$-2.5 < fn/fw < -0.6$, and $0.9 < D/skw < 3.0$

\where fn represents a focal length of the whole lens unit LN, fw represents a focal length of the zoom lens at the wide angle end, D represents a distance on the optical axis from an object-side surface of the negative lens LNN to an image-side surface of the positive lens LNP, and skw represents a distance on the optical axis from the image-side surface of the positive lens LNP to the image plane at the wide angle end.

12. The zoom lens according to claim 11, wherein
the rear group consists of a second lens unit having a positive refractive power, a third lens unit having a positive refractive power, and the lens unit LN arranged in order from an object side to the image side.

13. A zoom lens
comprising a plurality of lens units, intervals between adjacent ones of all of the plurality of lens units being changed during zooming, wherein
the plurality of lens units consist of a front group including at least one lens unit and a rear group disposed at an image side of the front group and including at least two lens units,
an interval between the front group and the rear group on an optical axis is the longest among all the intervals between the adjacent ones of the plurality of lens units at a wide angle end,
the front group has a negative refractive power at the wide angle end,
the front group consists of a first lens unit having a positive refractive power and a second lens unit having a negative refractive power arranged in order from an object side to the image side,
the rear group has a positive refractive power at the wide angle end,
the rear group consists of a third lens unit having a positive refractive power, a fourth lens unit having a positive refractive power, a fifth lens unit having a positive refractive power, a sixth lens unit having a positive refractive power, and a lens unit LN having a negative refractive power arranged in order from the object side to the image side,
the lens unit LN comprises a plurality of lenses including a negative lens LNN disposed closest to an object in the lens unit LN and a positive lens LNP disposed closest to an image plane, intervals between adjacent ones of all of the plurality of lenses not being changed during zooming, and
the following conditional expressions are satisfied:

$$-2.5 < fn/fw < -0.6, \text{ and}$$

$$0.9 < D/skw < 3.0$$

where fn represents a focal length of the whole lens unit LN, fw represents a focal length of the zoom lens at the wide angle end, D represents a distance on the optical axis from an object-side surface of the negative lens LNN to an image-side surface of the positive lens LNP, and skw represents a distance on the optical axis from the image-side surface of the positive lens LNP to the image plane at the wide angle end.

* * * * *